June 23, 1942. O. S. FIELD 2,287,423
SYSTEM AND APPARATUS FOR OPERATING PRISON CELL DOORS
Filed June 14, 1940 8 Sheets-Sheet 1
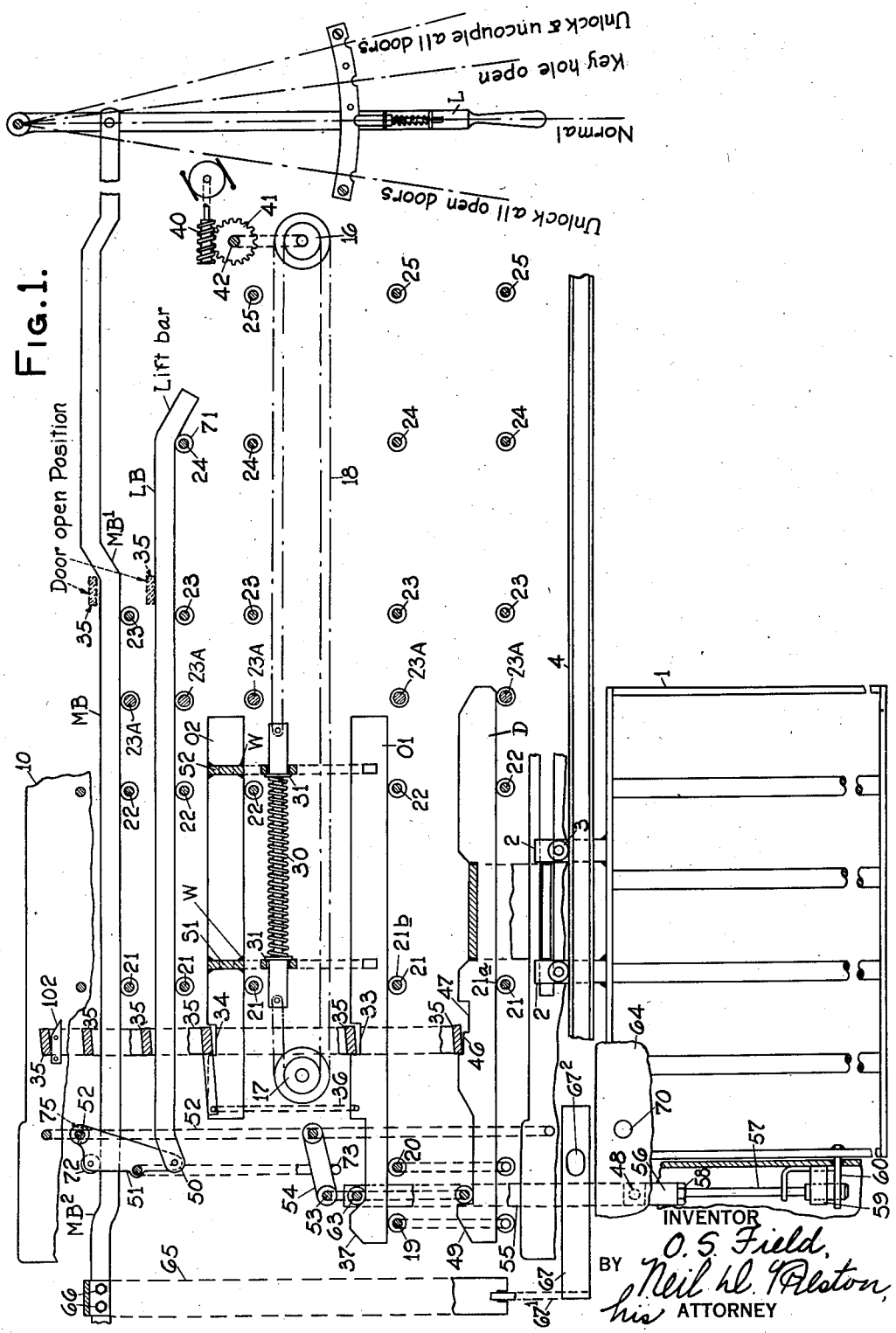

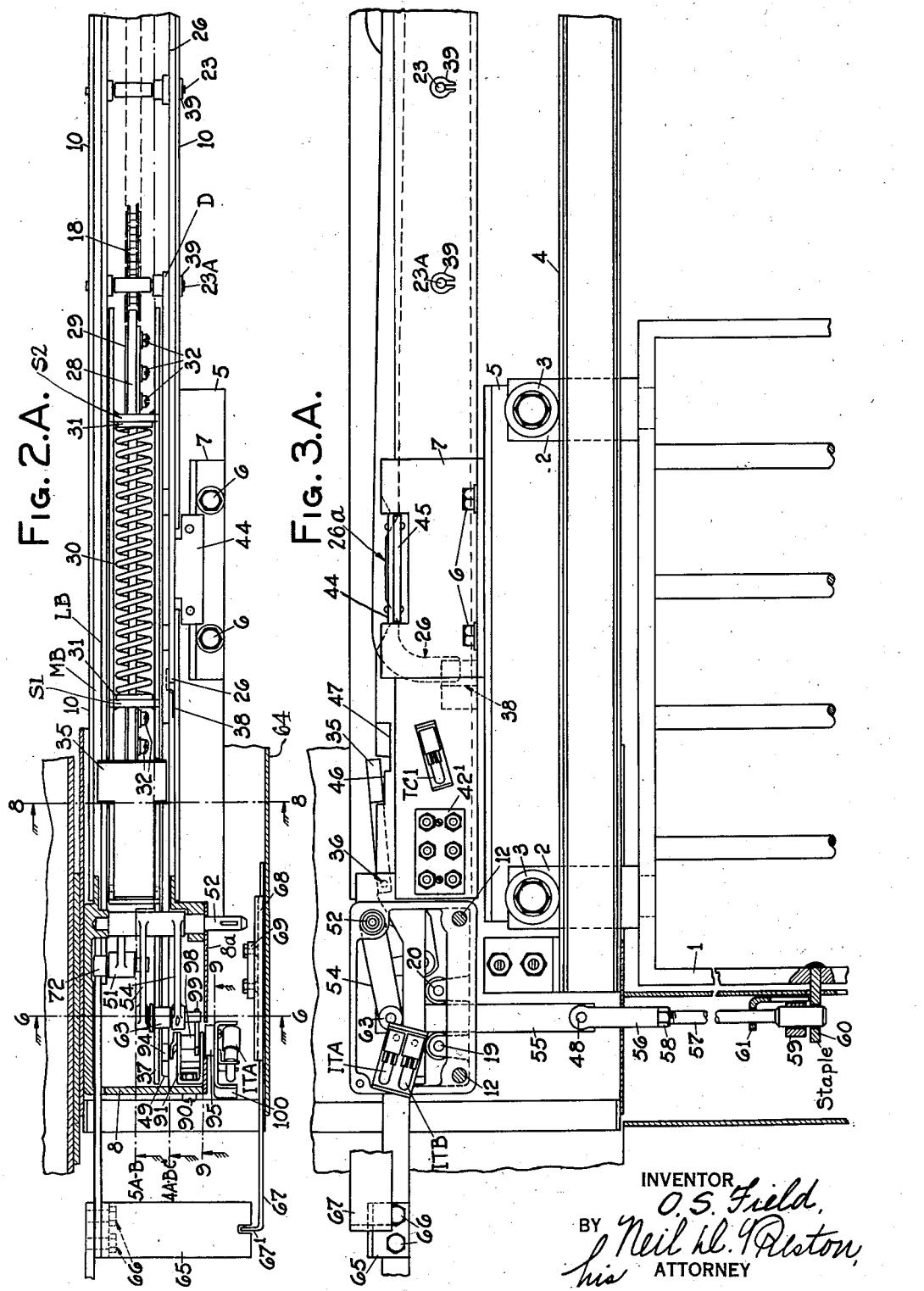

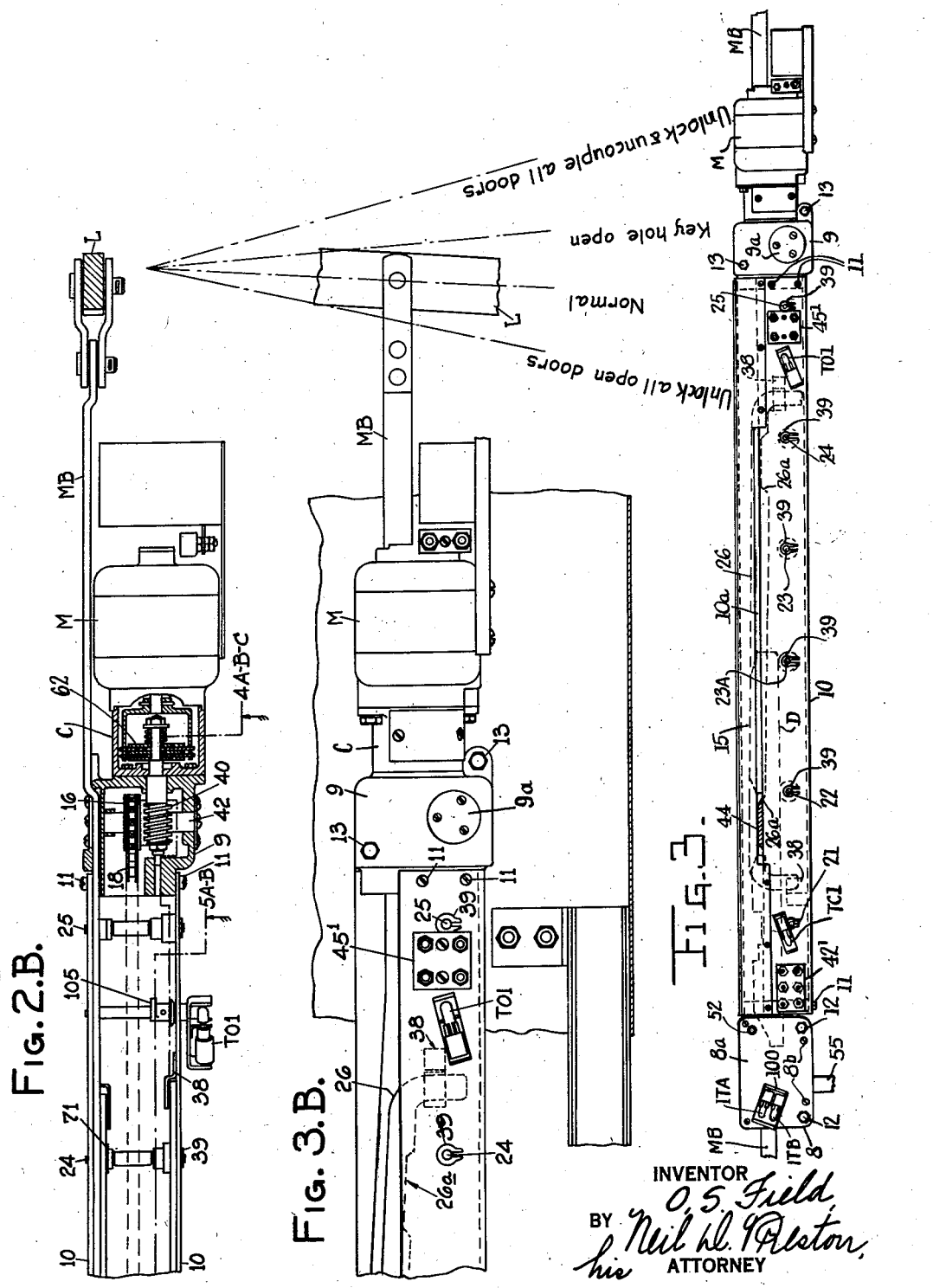

June 23, 1942.  O. S. FIELD  2,287,423
SYSTEM AND APPARATUS FOR OPERATING PRISON CELL DOORS
Filed June 14, 1940   8 Sheets-Sheet 4
FIG. 4.A.
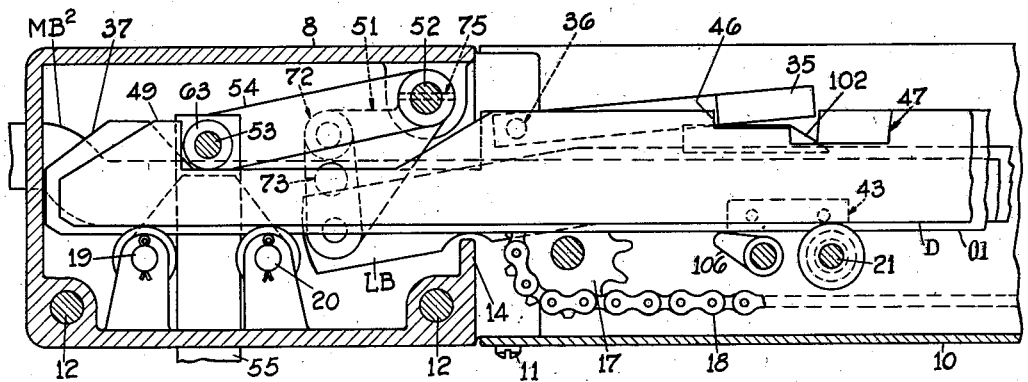
FIG. 5.A.
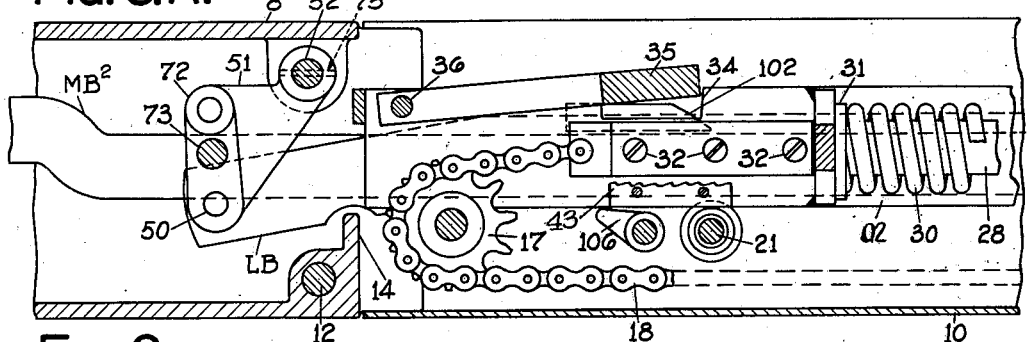
FIG. 6.   FIG. 7.
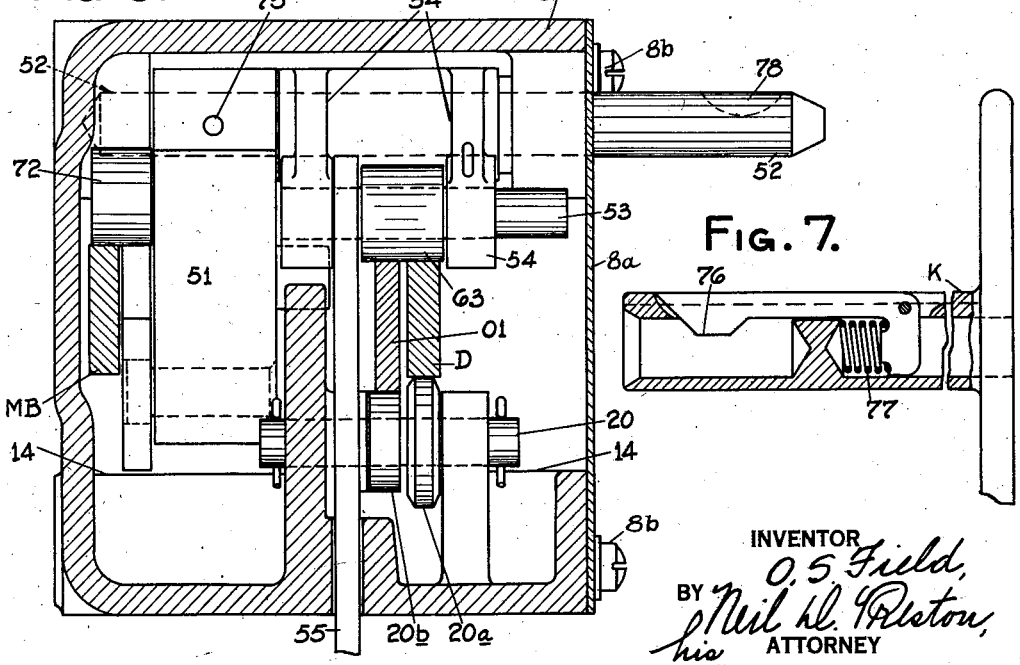
INVENTOR
O. S. Field,
BY Neil W. Preston,
his ATTORNEY June 23, 1942.                O. S. FIELD                2,287,423
            SYSTEM AND APPARATUS FOR OPERATING PRISON CELL DOORS
                    Filed June 14, 1940         8 Sheets-Sheet 5
FIG. 4.B.
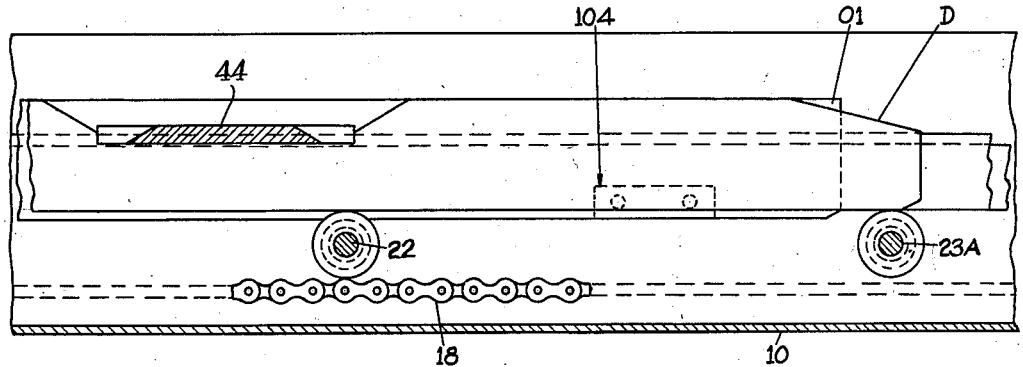
FIG. 5.B.
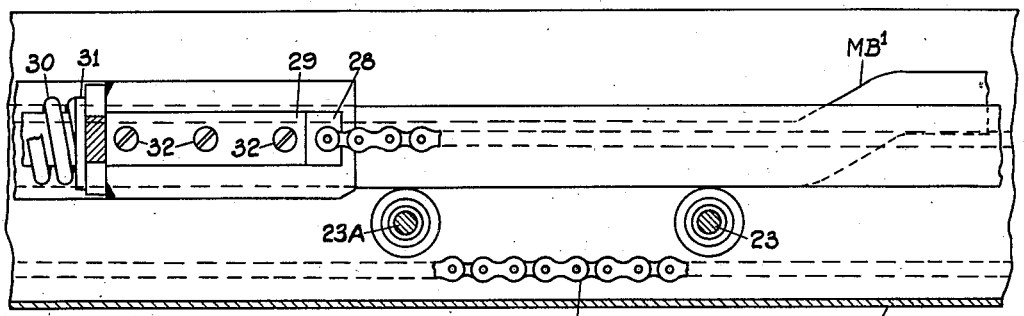
FIG. 8.
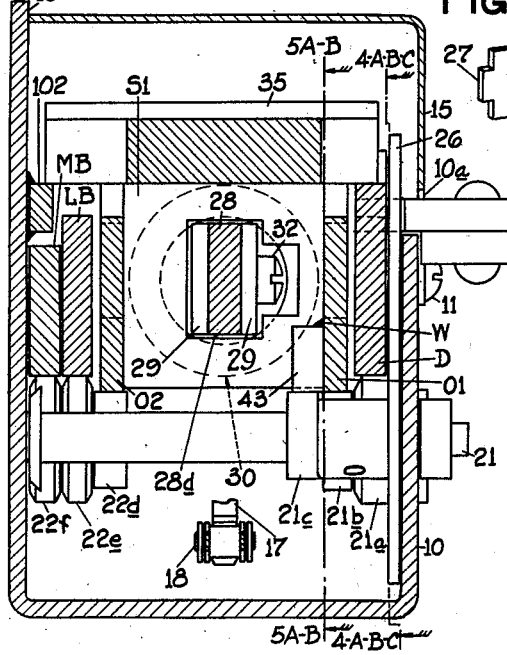
FIG. 8.A.   FIG. 9.
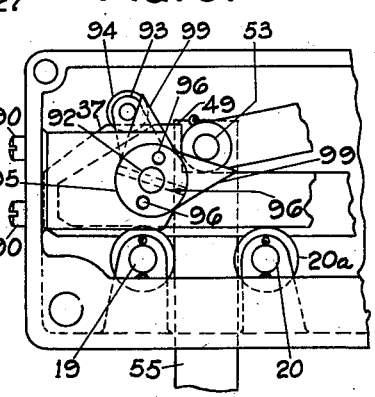
INVENTOR
O. S. Field
BY Neil L. Preston
    ATTORNEY June 23, 1942.                O. S. FIELD                2,287,423
SYSTEM AND APPARATUS FOR OPERATING PRISON CELL DOORS
Filed June 14, 1940          8 Sheets-Sheet 6
FIG. 4.C.
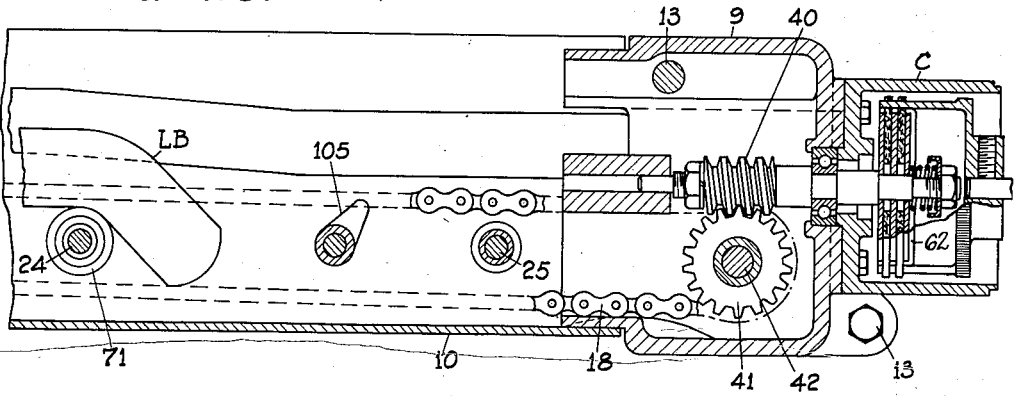
FIG. 10.
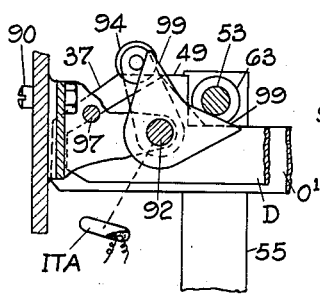
Door Closed Bolt Down
FIG. 11.
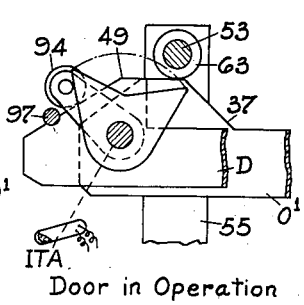
Door in Operation
FIG. 12.
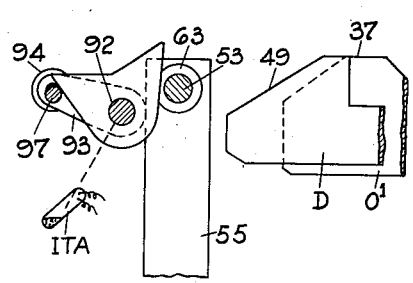
Door Open Bolt Down
FIG. 16.
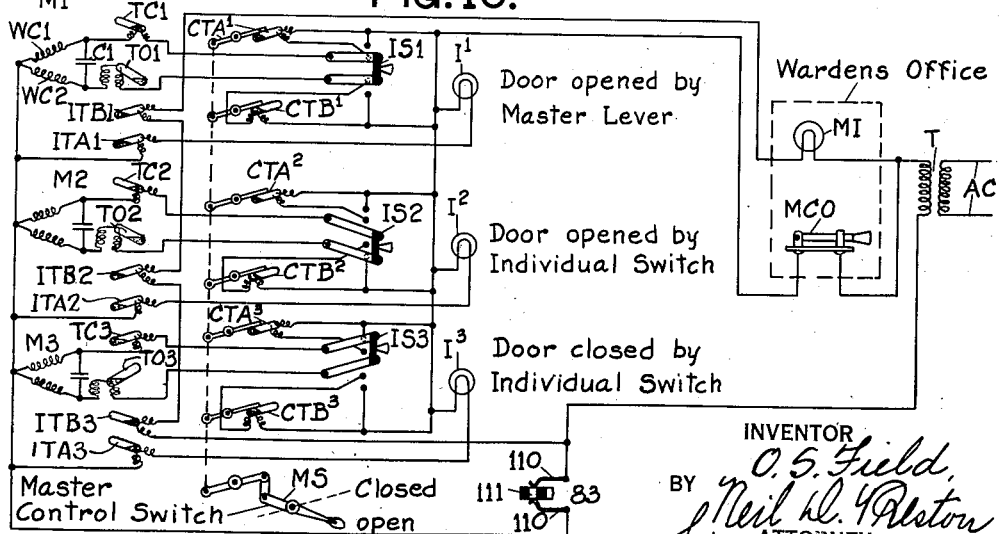
INVENTOR
O. S. Field
BY Neil W. Preston
his ATTORNEY June 23, 1942.　　　O. S. FIELD　　　2,287,423
SYSTEM AND APPARATUS FOR OPERATING PRISON CELL DOORS
Filed June 14, 1940　　　8 Sheets-Sheet 7
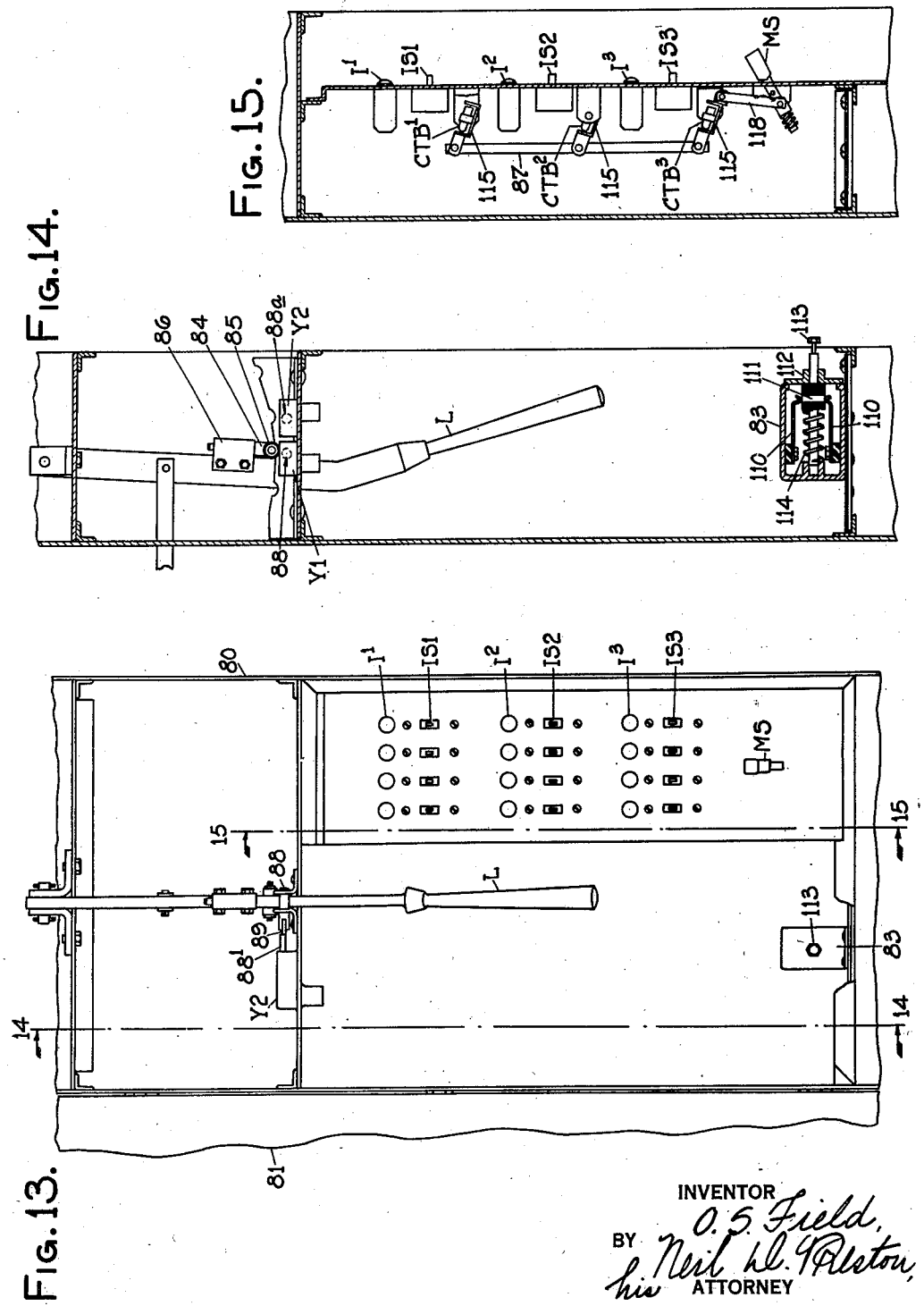
INVENTOR
O. S. Field,
BY Neil W. Preston,
his ATTORNEY June 23, 1942.  O. S. FIELD  2,287,423
SYSTEM AND APPARATUS FOR OPERATING PRISON CELL DOORS
Filed June 14, 1940  8 Sheets-Sheet 8
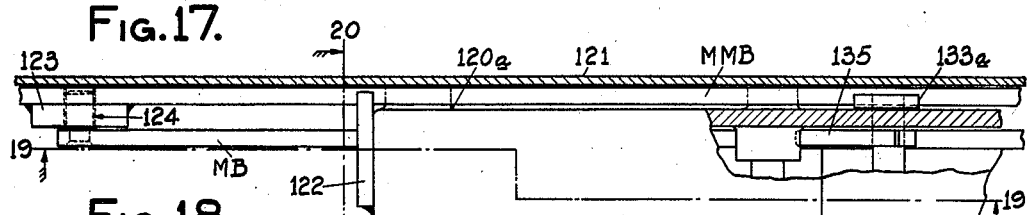
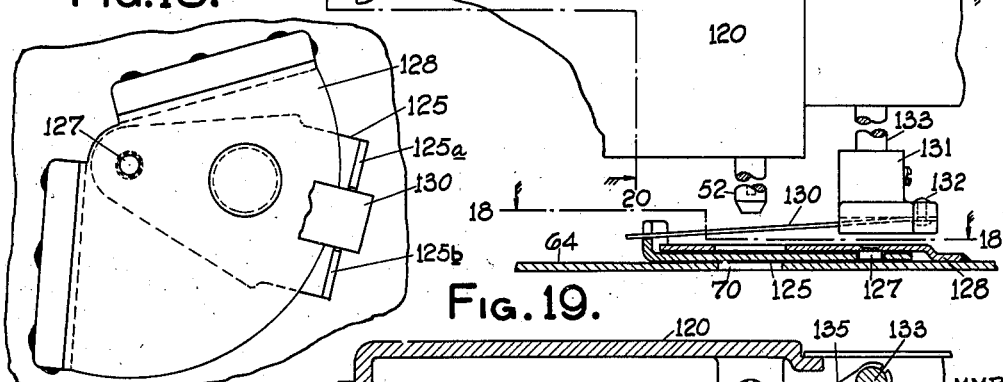
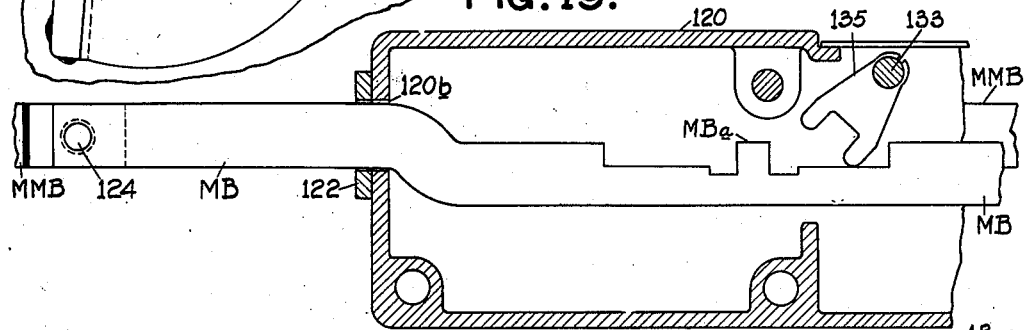
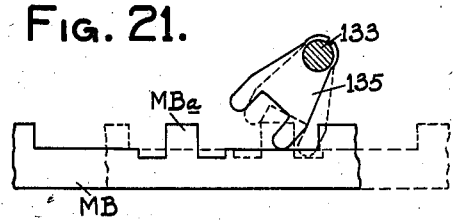
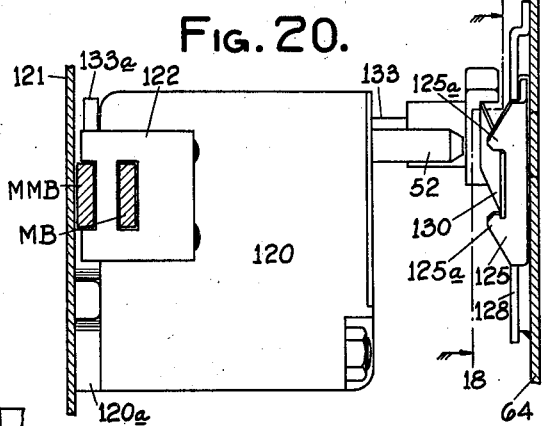
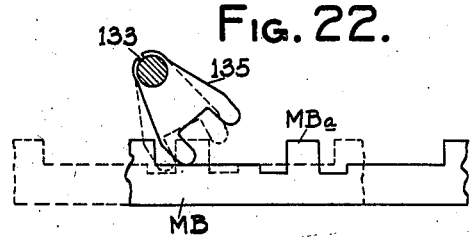
INVENTOR
O. S. Field,
BY Neil W. Preston
his ATTORNEY Patented June 23, 1942

2,287,423

UNITED STATES PATENT OFFICE 2,287,423

SYSTEM AND APPARATUS FOR OPERATING PRISON CELL DOORS

Oscar S. Field, Rochester, N. Y., assignor to General Railway Signal Company, Rochester, N. Y.

Application June 14, 1940, Serial No. 340,434

36 Claims. (Cl. 189—7)

This invention relates to a system and apparatus for controlling from a suitable remote control point by power or manually the opening and closing movement and locking and unlocking of prison cell doors, and is an improvement over the invention of my prior application Ser. No. 284,077 filed July 12, 1939.

In the prison contemplated in accordance with this invention, the cells are usually arranged in blocks or tiers preferably provided with sliding doors opening into a corridor; and it is desirable that a guard stationed at one end of the corridor, usually in some protecting cage or enclosure, or at some other suitable control point, should be able to unlock and open, or close and lock, the doors of the cell block individually, or in some selected group, or all at the same time, as occasions may require. For example, when the prisoners are to be released for work or for other purposes, the guard may wish to unlock and open from his station all of the cell doors of the cell block at the same time, or only some of the doors of cells then unoccupied or perhaps only some of the doors of the occupied cells to leave one or more prisoners confined while the others are released. Similarly, when the prisoners are marched to their cells, the guard may sometimes wish to close and lock by power all of the cell doors standing open at the same time, or at other times he may want to close and lock by power one or more of the doors standing open from time to time as these cells become occupied, or he may wish to have the doors free to be manually closed and locked by the prisoners. Further, occasion may arise where the guard may wish to let out or lock up one particular prisoner; and it is desirable that he should be able from his station to unlock and open, or close and lock, any selected one of the various cell doors in the block independently of the others.

Various other conditions in prison operation and routine duties make it desirable to provide a system of supervisory manual control from a suitable protected control point by which any desired number or group of cells may be readily opened or closed, locked or unlocked, either by power or by hand, safely and by a simple manipulation.

Various kinds of mechanical cell door operating and locking systems have been devised; but such systems involve various mechanical connections that are impracticable for long cell blocks, on account of the physical effort required for their manipulation, and the difficulties encountered in adjusting and maintaining the proper mechanical relationships under variations in temperature and the accumulated lost motion between various connected parts due to wear.

With these considerations in mind, and speaking generally without attempting to define specifically the nature and scope of this invention, it is proposed to provide a unitary power mechanism for each cell door which may be controlled electrically from any desired control point and operated by power to unlock and open, or close and lock, the corresponding cell door, and to arrange electrical control circuits with a master control switch and with individual control switches, one for each door, in such a way that the power mechanisms for the several doors of a cell block may be set into operation individually, or in any group as may be selected from time to time, thereby attaining a facility in a supervisory manual control of the power operation and locking of cell doors adequate for the various conditions and requirements of prison operation practice.

This unitary operating mechanism for each cell door comprises in general an electric motor, associated gearing, and chain drive and operating parts which may be controlled electrically from a suitable remote control point to unlock and move the door to its open position, holding it in its partially or fully open position, and also to close the door and hold it in its closed position, as well as automatically operate a lock bolt or other locking device when the door is near its closed position. Such power closing is accomplished in a manner to avoid any severe shock and jar, and occurring at such speed and with such a driving force as are not likely to injure a prisoner who may get caught in the door, or tries to obstruct its closing. The operating mechanism of this invention has other structural features and operating characteristics which will be explained hereinafter in connection with the description of the specific embodiment of the invention disclosed.

In connection with remote control of the power operation and locking of prison cell doors, it is desirable that the closed and locked condition of the various doors should be effectively and reliably indicated at the remote control point for the information of the guard; and suitable indication means for this purpose is provided in accordance with this invention, preferably by lighting small indicating lamps on a control panel identified with the respective cells by number designation or the like, when the corresponding door is fully closed and locked, such indicating lamp for each door being extinguished when either that door is not locked or is not fully closed.

Under some circumstances, as for example, in the case of derangement of the operating mechanism for a door, or in connection with some part of the prison routine, it may be necessary or expedient to unlock an individual door, and also disengage it from its operating mechanism irrespective of its position, as by manipulation of a key device, so that this door may be opened or closed by hand independently of all other doors when occasion requires. In order that such a key device may not be used improperly by some prisoner, it is proposed in accordance with this invention to provide means so that it is possible to use such a key device for any door only if such use is permitted by appropriate manual manipulation of the means by the guard or other authorized person at the point of remote control. More specifically, the system of this invention includes a master sliding bar extending the length of the cell block and operable manually only from the point of remote control so as to cover or uncover a hole adjacent each cell, and thus make it possible to insert and use the key device to unlock the corresponding door and free it from its operating mechanism only if the key hole is open.

In connection with the power unlocking and operation of prison cell doors under remote electrical control as contemplated, there is a further consideration that emergency conditions may arise, such as a fire accompanied by a power failure, where it is desirable to unlock and free all of the doors of a cell block simultaneously for hand operation, by means mechanically operated independently of the power supply. In accordance with this invention, it is proposed to provide for such emergency release of the doors by the same master bar extending the length of the cell block, this bar being effective mechanically by its movement independently of power supply to unlock all of the doors and disconnect them from their respective operating mechanisms, so that they may be opened manually by the prisoners in case of an emergency.

In the specific embodiment disclosed, the construction is simplified and cheapened by employing the same master sliding bar in one operated position to uncover the holes to receive the key device for the manual release of the individual doors, and in another operated position to provide for the emergency unlocking and disconnection of all of the doors. In this connection, provision is made so that variations in the extent of movement of this master bar at different points in its length, due to lost motion, expansion contraction by variations in temperature, or the like, will not interfere with the desired mechanical operations performed by this bar with respect to each of the doors in the cell block, by using an oblong hole in each of the keyhole covers and by providing sufficient inactive movement between points of active movements of the bar.

The operating mechanism contemplated includes a non-reversible gearing in the drive between the motor and the door, such as a worm drive, so that the door is held in its closed position by the mechanism independently of the regular lock, thereby affording an additional safeguard in keeping the door closed. With such non-reversible gearing, the operating mechanism also acts to hold the door in its open position, as well as in the closed or an intermediate position. There may be situations, however, where it is considered desirable for some reason to have the door free from the operating mechanism in its open position so that it may be closed by hand by the guard or the prisoner, as for example, when it is desired to require the prisoners to close their own cell doors when marched in to be locked up.

Accordingly, it is proposed in accordance with the invention to employ the same master bar to cause disengagement of all of the doors standing fully open from their operating mechanism when desired, so that these doors may be closed by hand, this being accomplished without affecting other doors provided they are partially or fully closed. When any door is thus closed by hand, its lock is automatically engaged; and the door remains locked until unlocked by the operating mechanism, key device, or emergency manual release.

In connection with such release of the doors in their fully open position, or disconnection of the door from its operating mechanism by use of a manual key device, or by actuation of the master emergency release, whenever the operating mechanism for such disconnected door is subsequently moved to the open or closed position, as the case may be, it is operatively connected again automatically to the door, irrespective of the position in which it may be standing, so that the operating mechanism can be used thereafter to actuate the lock and move the door by power in the normal manner.

Other characteristic features, attributes, and advantages of the invention will be in part apparent and in part explained as the description progresses.

In the accompanying drawings, Fig. 1 is a diagrammatic and side isomeric illustration of the general organization and construction of the door and lock operating mechanism of this invention as applied to one cell door, together with the associated master bar and its operating lever, the parts being shown in a manner to facilitate an understanding of their structural arrangement and operation.

Figs. 2A and 2B when laid side-by-side show a plan view of the operating and locking mechanism with the top cover removed.

Fig. 3 shows, on a reduced scale, an external side elevation of the mechanism casing.

Figs. 3A and 3B when laid side-by-side illustrate a side elevation of the mechanism casing on a larger scale than Fig. 3 with the top cover of the entire casing and the side plate of the lock bolt casing omitted to expose some of the mechanism.

Figs. 4A, 4B, and 4C when laid side-by-side illustrate a vertical section of the mechanism taken on the line 4A—B—C of Figs. 2A, 2B and 8 as viewed in the direction of the arrows.

Figs. 5A and 5B when laid side-by-side illustrate a vertical section of the mechanism taken on the line 5A—B of Figs. 2A, 2B and 8 as viewed in the direction of the arrows.

Fig. 6 shows a vertical section taken through the lock bolt casing crosswise of the mechanism and along the line 6—6 of Fig. 2A as viewed in the direction of the arrows.

Fig. 7 shows partly in section the key for unlocking an individual door.

Fig. 8 shows a vertical section through the mechanism casing taken on a line 8—8 of Fig. 2A as viewed in the direction of the arrows.

Fig. 8A shows the spacing block for spacing the two operating slides O1 and O2 on a reduced scale.

Fig. 9 shows a portion of the lock-bolt casing with side plate removed similar to left-hand end of Fig. 3A but with the two mercury contact tubes and their carrying plate removed and is taken along the line 9—9 of Fig. 2A as viewed in the direction of the arrows.

Figs. 10, 11 and 12 show the mechanism illustrated in Fig. 9 for tilting the mercury contact tubes shown in Figs. 2A and 3A in three different positions.

Fig. 13 shows a front elevation of the operating cabinet with the door open.

Fig. 14 shows a vertical section through this cabinet taken on a line 14—14 of Fig. 13 as viewed in the direction of the arrows.

Fig. 15 shows a vertical section taken through switch compartment of the operating cabinet taken on the line 15—15 of Fig. 13.

Fig. 16 illustrates diagrammatically the circuits for three prison doors and their indicating lamps.

Fig. 17 shows a top view with parts broken away of a modified construction of the present invention wherein the master bar may be of a one piece bar extending back of the mechanism casings instead of through them.

Fig. 18 is a sectional view taken along the line 18—18 of Figs. 17 and 20 as viewed in the direction of the arrows.

Fig. 19 is a sectional view taken along the line 19—19 of Fig. 17 as viewed in the direction of the arrows.

Fig. 20 is a sectional view taken along the line 20—20 of Fig. 17 as viewed in the direction of the arrows.

Fig. 21 shows a portion of the release bar of Fig. 17 in the first or "unlock all open doors" position by solid lines and shows it in the second or normal position by dotted lines; and Fig. 22 shows the same portion of the release bar in its third or "key hole open" position by dotted lines and in its fourth or "unlock and uncouple all doors" position by solid lines.

The system and apparatus for operating prison cell doors in accordance with this invention may be applied to various types of cell block construction; but the specific embodiment illustrated is arranged to conform with the typical or conventional cell block construction involving the usual fixed cell fronts, sliding doors, corner posts or pilasters, and preferably including a casing or chaseway of suitable structural form extending the length of the cell block above the doors. It is contemplated that the operating mechanisms for the several doors in the block will be mounted in this casing above the doors and wholly enclosed and protected, the front cover for this casing being removable in sections to give access to the mechanisms individually, such covers being locked by a suitable mechanical device (not shown) releasable from the control cabinet at the end of the cell block in accordance with the usual practice.

The general cell structure with the casing and door support illustrated is merely a typical or representative application of the invention. As shown, the cell doors 1 of the usual sliding type are supported by hangers 2 which extend through an opening in the bottom of the casing and carry rollers 3 running on track 4 in the usual way.

Generally speaking, the system of this invention comprises a separate and unitary power operating mechanism for each door, electrically connected by suitable control circuits to a master control switch, and individual control switches one for each door, and by suitable indicating circuits to indicating lamps, all mounted on a control panel in a cabinet or compartment located at the end of the cell blocks, and suitably housed and protected so as to be accessible only to authorized persons. In addition to such unitary cell door operating mechanism, with their supervisory control and indicating circuits, the system of this invention also includes a master slide bar extending the length of the cell block inside the casing above the doors, which is connected to a hand lever in the control cabinet and arranged to be operated to different positions for the purpose of uncovering the holes associated with the respective doors to permit use of the key device for manual unlocking and release of the doors individually, for the emergency unlocking and release of all of the doors simultaneously, and to determine whether the doors shall be free or held locked in their open positions.

*Door operating mechanism*

Considering first the construction of the unitary power mechanism for each door, only one of these mechanisms has been illustrated, and it should be understood that like mechanisms are provided one for each of the various doors of a cell block, or other group of doors under one supervisory manual control from the same control point, these various mechanisms being the same and being electrically connected with individual indicating lamps and control switches, as well as being controllable by a master control switch.

The unitary power mechanism under consideration consists of two castings 8 and 9 (see Figs. 3, 4A, 4C and 5A) each having a squared neck about which a steel intermediate casing 10 is telescoped. This intermediate steel casing 10 is of general U-shape to constitute the bottom and two side walls of the main casing which is screw fastened as by screws 11 about the necks of the two end castings 8 and 9. These end castings 8 and 9 are fastened to the wall of the cell block directly above the cell door in any suitable manner as, for instance, by headed bolts screwed into threaded holes in said wall, these bolts being designated 12 for the casting 8 and being designated 13 for the casting 9. The casing 8 is provided with a thin front cover 8a fastened thereto by screws 8b (see Figs. 2A, 3 and 6). Attention is directed to the fact that these castings are oil tight and that the casting 8 is provided with a partition 14 (see Figs. 4A and 6) extending up from the bottom to a point just below the side bars of the operating mechanism, this partition being imployed to prevent the lubricant in the steel casing 10 from flowing into the casting or casing 8, this lubricant being raised to a level to allow the lower portion of the chain sprocket wheels 16 and 17 and the lower portion of the various supporting rollers on spindles 21, 22, 23A, 23, 24 and 25 to dip ino the oil or other lubricant to thoroughly lubricate all of the moving parts of the operating mechanism.

The door operating mechanism includes a pair of operating slide bars O1 and O2 which are spaced apart by spacers S1 and S2 of which the spacers S1 is shown in perspective in Fig. 8A, of the drawings. Each of these slide bars O1 and O2 is provided with rectangular holes to receive the ears 27 of the spacers S1 and S2. These spacers when assembled between the operating slide bars O1 and O2 are then welded in place as indicated by the weld W. As clearly shown in Fig. 8A (see also Fig. 8) each of the spacers S1 and S2 is provided with a rectangular main opening 28d through which passes a tension bar 28 having screw fastened thereto a pair of push bars 29, as by screws 32 (see Figs. 2A, 5A, 5B and 8), the holes 28d in the spacers S1 and S2 being notched to afford clearance for the heads of these screws 32. The tension bar 28 is surrounded by a compression spring 30, which is under initial compression, and which has its ends bearing against washers 31, each of which washers has a rectangular opening which is of a size to permit the tension bar 28 to freely pass therethrough but which prevents the push bars 29 from passing therethrough. By this construction if the unitary structure comprising the tension bar 28 and the push bars 29 is moved either to the right or to the left (see Figs. 1 and 2A) the compression spring 30 is further compressed, so that the unitary bar structure 28—29 is slidably mounted in the spacers S1 and S2 with the tension bar 28 under initial tension tending to maintain this bar structure in its normal spring pressed position. A drive chain 18 is contained on the driving chain sprocket 16 and on the idler chain sprocket 17, which chain 18 has its ends connected to the ends of the bar structure 28—29, so that rotation of the motor driven sprocket 16 in a clockwise direction will slide the operating bars O1 and O2 to the right in a door opening direction and so that rotation of this driving sprocket 16 in a counter clockwise direction will slide the door slide bars O1 and O2 in a door closing direction, the operating forces to drive the door slides O1 and O2 being transmitted through the medium of the initial compression of spring 30, so that if the door slide bars move rather freely the spring 30 will not be further compressed but if movement of the slide bars is interfered with, as by a prisoner caught by or otherwise obstructing movement of the door, additional compression of the spring 30 may take place.

The operating slide bars O1 and O2 are provided with notches 33 and 34 in which the cross member of the T-shaped coupler 35 may drop, this T-shaped coupler 35 being pivotally supported by the slide bars O1 and O2 through the medium or a cross pin 36 (see Figs. 1, 2A, 3A, 4A, 5A and 8). The left-hand end of the operating side bar O1 is provided with a cam portion 37 sloped on both sides thereof for the purpose of lifting the lock bolt during power opening and power closing of the door as more particularly described hereinafter.

The driving sprocket 16 is suitably driven by a non-reversible driving connection between it and the driving motor M (see Figs. 2B, 3B and 4C). By non-reversible gearing is meant a gearing which may be driven from one end of the gear train but which cannot be driven from the other end thereof. In the particular construction shown this non-reversible gearing comprises a worm 40 driven by the motor M through a suitable friction clutch 62 located in casing C (see Figs. 2B and 4C), which worm 40 engages a worm wheel 41 which worm wheel 41 is connected to the same shaft 42 to which the driving sprocket 16 is connected. The shaft 42 is held in the casing 9 by a cover 9a (see Figs. 2B, 3 and 3B). The worm 40 has such a pitch as compared with the friction between it and the worm wheel 41, that the worm 40 may drive the worm wheel 41 but so that the worm wheel 41 cannot drive the worm 40 together with the friction clutch C and the armature of the motor M if ordinary forces are applied. In other words, although the motor M may drive the sprocket chain 18 this sprocket chain cannot drive the motor even though the force of several men is applied to the operating bars O1 and O2. The operating bars O1 and O2, although they may be supported to slide on a suitable flat surface, have been shown to be supported by the rollers 19 to 25, inclusive, the bar O2, however, since it is shorter being supported only on the rollers supported by spindles 21 to 25, inclusive. From the foregoing description of the power operated mechanism it is obvious that rotation of the motor M in one direction will cause the slide bars O to be moved to the right and rotation of this motor in the other direction will cause the operating slide bars to be moved toward the left. As more clearly pointed out hereinafter suitable circuits are provided to control the motor M so as to be operated in each of these directions, which circuits include limit switches TO and TC, the letters O and C signifying that they limit operation of the motor M in the opening direction and the closing direction, respectively.

*Coupling mechanism*

Referring to Fig. 6 it will be seen that spindle 20 is provided with rollers 20a and 20b and referring to Fig. 8 it will be seen that the shaft or spindle 21 is provided with rollers 21a, 21b and 21c, and that spindle 22 is provided with rollers 22d, 22e and 22f. These spindles 20, 21 and 22 each have an enlarged portion near the middle thereof to form a shoulder against which the rollers contained thereon may bear. The rollers 20a and 21a support the door slide D, wheras the rollers 20b and 21b support the operating slide bar O1 and the roller 21c supports the cam 43 welded to the operating bar O1 (see Fig. 8) which operates the limit switch TC1 to be described hereinafter. It will also be seen, by referring to Fig. 8, that the shaft 22 is provided with rollers 22d, 22e and 22f for supporting the operating slide O2, the lift bar LB, and the master bar MB, respectively.

The door bar D has welded or otherwise secured thereto a horizontally projecting lip 44 to which is riveted a slide plate 45 (see Fig. 8). This lip 44 and slide plate 45 may engage between the teeth of the fork comprising hangers 2 of the door 1 (see Fig. 1), so that sliding movement of the door slide bar D may through the medium of the lip 44 operatively engage the door 1 to cause the door to be moved horizontally by the door slide bar D and at the same time will permit slight up and down movement of the door 1 with respect to the door slide bar D. In the more detailed construction shown in Figs. 2A and 3A the door hangers 2 have secured thereto an angle bar 5 to which is bolted, as by bolts or cap screws 6, a notched angle bar 7 to constitute a fork engaged by the lip 44 and slide plate 45.

Referring to Figs. 1 and 3A it will be seen that the upper edge of the door slide D is provided with a long notch 46 in the bottom of which there is a small notch 47, the latter being of substantially the same width as the cross piece of the T-shaped coupler 35. The notch 46 when engaged by the cross portion of the T-shaped coupler 35 affords a lost motion connection between the operating slide bars O1 and O2 and the door slide bar D, if, however, the T-shaped coupler drops into the notch 47 these bars O1, O2 and D are connected together without such lost motion. In the event that the T-shaped coupler 35 is lifted to a point above the door slide bar D no operative connection of any kind between the operating slide bars O and the door slide bar D is present. The door slide bar D is also provided with a cam portion 49 which serves to lift the lock bolt only when the door is moved in the closing direction in a manner as explained hereinafter, and the square part of which also serves as an additional locking means for the door when the lock bolt is in its lower locked position back of the square part of this cam 49.

In order to provide means for lifting the T-shaped coupler 35 to uncouple the operating slide bars O from the door slide bar D a lift bar LB has been provided. This lift bar is of the general shape shown in Figs. 1, 4A, 4C and 5A and normally rests on the rollers supported on shafts or spindles 21, 22, 23 and 24. As clearly shown in Figs. 1, 4A, 4C and 5A the left-hand end of this lift bar LB is supported as by a pin 50 in the lower end of a release bell crank 51, which release bell crank is supported by the shaft 52 journalled in the casting 8 and rotatable by the key K (see Fig. 7) and by the release master bar MB. From this structure it is readily apparent that if the release bell crank 51 is rotated in a clockwise direction that the lift bar LB is swung upwardly and toward the left at its left-hand end as a result of which the right-hand downwardly bent end (see Fig. 4C) rides up on the roller supported by shaft 24, so that the lift bar LB is swung toward the left and lifted at both ends at substantially the same rate of movement. This lifting of the lift bar LB by parallel movement throughout its entire length is capable of lifting the T-shaped coupler 35 out of the notches 46 and 47 of the door slide bar D irrespective of the position assumed by the door at this time. The net result is that the door 1 may be entirely uncoupled from the operating bar O1 through the medium of the lift bar LB irrespective of whether the door 1 and the operating slide bars O assume the closed, the open, or some intermediate position.

By referring to Figs 2A, 2B, 3A, 3B, 4B and 8 it will be observed that the lip 44 is tapered at its edges where it passes through a slot 10a formed between the lower edge of the cover 15 and the top edge of the intermediate casing 10 (see particularly Figs. 3, 4B and 8). This tapering has been provided so that this lip 44 can serve as a double cam to lift the shutter 26 having drooping rounded ends as most clearly shown in Figs. 3, 3A and 3B, which drooping rounded ends slide back of Z-shaped guides 38. Near each of its ends the lower edge of the shutter 26 is notched by notches 26a which are tapered at each side. These notches 26a serve as cams cooperating with the sloped portions of the lip 44 to lift the shutter 26 and open the slot 10a (see Fig. 8) when the door is in transit and to allow reclosure of this slot when the door 1 is either fully closed or fully open. In other words, the slot 10a as well as notches 26a are closed by the shutter 26 when the door is either fully closed or fully open and this shutter is automatically opened and closed when required and without any special mechanism. In order to prevent oil from working its way out at the journals for spindles 21—25 horse-shoe washers 39 are clipped into notches near the front ends of these spindles as most clearly shown in Figs. 2A, 2B, 3, 3A and 3B. As shown in Figs. 3, 3A and 3B terminal blocks $42^1$ and $45^1$ are fastened to the front wall of the casing 10. These terminal blocks facilitate the making of connections between the pigtails leading from the mercury type contact tubes ITA, ITB, TC1 and TO1 and the out-going wires.

Locking mechanism

On the spindle 52 which supports and has pinned thereto the release bell crank 51 is pivotally supported a bifurcated lock bar link having two legs 54 (see Figs. 1, 2A, 3A and 4A). To the free end of this bifurcated link 54 is pivoted, as by a pin 53, a lock bar operator 55, which in turn is pivotally connected in the fork of a clevis 56, as by a pin 48, into the closed end of which clevis is threaded the lock bolt 57. This threaded connection may be locked in any suitable adjusted position as by a lock nut 58. Near its lower end this lock bolt 57 is enlarged to constitute an enlarged cylinder which is supported for sliding movement in the lock bolt guide 59. The cell door 1 is provided with a perforated staple which assumes a position within the pilaster a distance to have its perforation receive the lock bolt 57 when the door is in the full closed position and the lock bolt 57 is in its lower locked position. In order to close the staple opening through which the staple 60 passes into the pilaster a staple-hole cover 61 has been provided. This staple-hole cover 61 is of general L-shape having the shorter leg thereof provided with a round hole to receive the reduced portion of the lock bolt 61, but insufficiently large to allow the enlarged portion of this lock bolt to pass therethrough, whereby lifting of the lock bolt 57 will also lift the staple-hole cover to permit the staple 60 to pass through the staple hole into the pilaster upon closing movement of the door and at the same time cause this opening to be closed when the door is in its open or some intermediate position.

Referring to Figs. 1 and 4A it will be seen that the cam portion 49 of the door slide bar D is tapered on its left side only, that is, it has a vertical edge on its right-hand side from which it is apparent that closing movement of the door, possibly by hand, will cause this sloped portion of the cam 49 to lift the roller 63 pivotally supported on the pin 53 passing through the bifurcated link 54 as a result of which the roller 63 and the lock bar operator 55 are lifted resulting in the lifting of the clevis 56 and the lock bolt 57. If, on the other hand, the operating mechanism is moved from some intermediate or door open position to the door closed position the cam 37 constituting part of the operating slide bar O1 will similarly engage the roller 63 to cause it to swing the bifurcated lock bar link 54 upwardly resulting in the lifting of the lock bolt 57. Attention is directed to the fact that the cam 37 constituting part of the operating slide bar O1 is sloped on both sides. This construction is employed to perform the function of lifting the lock bolt 57 during both directions of movement of the operating slide bars O near the door-closed position. In order to afford movement of this cam 37, it being understood that the lock bolt roller 63 is locked back of the vertical locking edge of the cam 49, a certain amount of lost motion between the operating slide bars O and the door bar D is necessary. It is, however, desirable not to have such lost motion between the door 1 and its power operating mechanism when the door is open to an extent to allow the prisoners to get hold of the of the door because prisoner to get hold of the edge of the door because prisoners are tempted to shake the door with respect to its operating mechanism. In order therefore to provide lost motion between the door and its operating mechanism near the door-closed position and not to afford such lost motion at any other position of the door the door slide bar D has been provided with a lost-motion notch 46 and a coupling notch 47, a lost motion cam 102 welded to the back wall of casing 19 being provided to cause lifting of the coupler 35 out of the coupling notch 47 into the lost motion notch 46 for those positions of the door at and near its fully closed position. That is motion of the operating bars O toward the left is permitted after the door 1 has been fully closed and this excess movement of the operating slide bars O permits the cam 37 to advance to the left far enough to allow the lock bolt 57 to be lowered into its locked position.

*Release for manual closing*

As already pointed out the door 1 and the door slide D to which it is at all times operatively connected is under normal conditions connected to the operating slide bars O through the medium of a T-shaped coupler 35. It has also been pointed out that the operating slide bars O are connected to the motor M through the medium of non-reversible gearing. From this it is apparent that if the door has been operated to either an intermediate or a door-open position that the door is held or locked in such position by being connected to the motor M through non-reversible gearing. Under certain conditions of prison cell door operation as, for instance, when prisoners are marched into the corridor of a cell block each to his individual cell, it may be desirable, as a punitive measure, to have each prisoner close his own door and lock the same, the procedure being deemed to be one to develop discipline. In order to allow each prisoner to close his door by hand suitable means has been provided to uncouple only those doors from their respective operating slide bars which are in their full-open position. To accomplish this result, and for other purposes, the master slide bar MB has been provided. Referring to Figs. 1 and 5B it will be seen that this master slide bar MB is provided with two Z-shaped kinks $MB^1$ and $MB^2$. The kink $MB^1$ in this master release bar MB is provided so that if the lever L is operated to its extreme left-hand position, see Figs. 1 and 14, this kink $MB^1$ will be so positioned (see Fig. 1) that during movement of the operating slide bars O and the door slide bar D to their full-door open position, as through the medium of the motor M, its non-reversible gearing, and the chain 18, the T-shaped coupler 35 will ride up this kink $MB^1$ to an elevation where the operating bars O are uncoupled from the door bar D. Not only if the lever L be positioned in the "unlock all open doors" position prior to opening movement of the door will the door and its slide bar D be uncoupled from the operating bars O, but this uncoupling action will also take place if the lever L is moved to the "unlock all open doors" position after the door and its operating mechanism has already assumed the door-open position. In other words, movement of the release master bar MB to the left will so position the kink $MB^1$ that if the operating bars O are fully open, no matter when they reach the full open position, the T-shaped coupler 35 will be lifted to uncouple the door from its operating mechanism. This construction, therefore, enables the guard to determine whether the door shall be free to be moved or shall be locked when in its full door-open position.

Let us now consider what will happen if the door is in its full-open position and the operating mechanism is in its full-open position and the operating mechanism is then moved by power to the full closed position under the following two conditions: (1) with the release bar MB in its "unlock all open doors" position, and (2) with the release bar in its "normal" position after having assumed the "unlock all open doors" position when the door was opened by the operating mechanism. Under condition 1 the door will be moved to the closed position by the coupler 35 engaging the left wall of the notch 46 in door slide bar D and under condition 2 the door will be moved to the closed position by the coupler 35 engaging the left wall of the notch 47 in door slide bar D. That is under conditions one (1) there will be lost motion during closing movement, whereas under condition 2 there will be no such lost motion until the door reaches its closed position. The reason that under condition 1 the T-shaped coupler 35 will fall into the shallow part 46 of the notch 46—47 in door slide D is because during opening movement of the door the door slide D was moved to the right by the coupler 35 engaging the right hand wall of notch 47 after it had been raised to a level above the left-hand wall of notch 47, so that upon movement of the coupler 35 toward the left and down the incline of kink $MB^1$ it was not able to drop vertically into notch 47 but instead moved diagonally into the shallow part 46 of the notch 46—47. That is, the coupler falls into the shallow notch 46 because it passes over the notch 47 as it rides down kink $MB^1$ before it is low enough to engage bar D. If the door is suddenly jerked toward the left during its closing movement under condition 1 the T-shaped coupler 35 will of course drop into deep part 47 of notch 46—47 and no lost motion will thereafter exist until the door has reached the closed position and the cam 102 has again partially lifted the T-shaped coupler 35.

*Key and emergency release*

The master bar MB above described performs two functions in addition to the function of determining whether the door shall be free or locked when in the full open position, namely, the function of removing the key hole covers from all of the key holes, and secondly the function of unlocking all of the closed doors and simultaneously therewith uncoupling the doors from their operating mechanism by the lifting of the T-shaped coupler 35, this uncoupling function being independent of the positions assumed by the doors. Over each cell pilaster an L-shaped member 65 is bolted to the master bar MB as by bolts or cap screws 66 (see Figs. 1, 2A and 3A). This L-shaped member 65 is notched at its free end to receive one leg $67^1$ of a key hole cover 67. This key hole cover 67 (see Fig. 2A) is supported for sliding movement in a suitable U-shaped strap member 68 so that the key hole cover 67 will be slid back and forth in a horizontal direction with the movement of the release master bar MB in a horizontal direction. This U-shaped strap 68 is provided with countersunk holes through the medium of which it is bolted to a fixed support 69, the key hole cover 67 being held in the U-shaped strap by the outer removable cover closing the chase way above the cell door which outer cover 64 is held in locked position by a suitable master lock bar (not shown) accessible for operation only through the door of the operating cabinet. As illustrated in Fig. 1 this key hole cover 67 is provided with an oblong key hole $67^2$ which will come in registration with the key hole 70 contained in the removable cover over the chase way located above the various prison doors and which chase way contains all of the various operating mechanisms. This registration of the key holes $67^2$ and 70 takes place when the operating lever L located in the control cabinet at the end of each cell block assumes its "key hole open position."

The kink $MB^2$ of generally Z-shape contained in the master operating bar MB comes into play when the lever L is moved to its extreme right-hand or "unlock and uncouple all doors" position. Referring to Figs. 1 and 5A it will be seen that upon movement of the release master bar MB to its extreme right-hand position the kink portion $MB^2$ of this master bar MB will lift the roller 72 (see Figs. 1, 2A, 4A, 5A and 6) pivotally mounted to the release bell crank 51 causing this bell crank 51 to be rotated about its pivot pin 52 in a clockwise direction. This movement of the bell crank 51 in a clockwise direction causes the lift bar LB to be moved and raised in a left-hand upwardly direction with substantial parallel movement, the right-hand drooping end sliding up on the roller 71 on spindle 24 (see Figs. 1, 2B and 4C), thus resulting in the lifting of the T-shaped coupler 35 irrespective of the position assumed by the operating slide bars O at this time. This will, of course, result in uncoupling the door slide D from the operating slide bars O. This swinging of the release bell crank 51 in a clockwise direction also causes its pin 73 to engage the lower edge of the bifurcated link 54 (see Figs. 1, 4A and 5A) to cause the lock bolt 57 to be lifted to its unlocked position.

It is thus seen that movement of the lever L to the first position to the right of its normal position will result in opening of all of the key holes of the cell block and that movement of this lever L to its extreme right-hand position will unlock all of the doors from their respective pilasters and will uncouple all of the doors from their respective operating slide bars O.

With the various key hole covers 67 in their open position a guard may take the key which is normally stored in the control cabinet, which key has been shown partly in section in Fig. 7 of the drawings, and may then open any particular one of the doors by rotating the shaft 52 to which the release bell crank is fixedly secured as by a pin 75 (see Figs. 1 and 5A). The key K (see Fig. 7) is of general socket wrench shape and construction, but instead of having the hole extending into its shaft of the usual hexagonal configuration this opening is preferably round to receive the round shaft 52 to which the release bell crank 51 is pinned by pin 75. This key K is provided with a spring operated key member 76 which is spring pressed to its active engaging position by a compression coil spring 77, all as clearly shown in Fig. 7. It is readily seen that the key K may be pushed over the tapered end of the shaft 52 and that if the key member 76 is not in registration with the key slot 78 (see Fig. 6) that the key member 76 will be pushed outwardly causing the spring 77 to be further compressed. If now the key K is attempted to be rotated it will rotate freely until the key member 76 lies over the key slot 78 at which time the spring 77 will snap the key member 76 into the key slot 78, so that the guard may by further turning of the key K in a clockwise direction rotate the release bell crank 51 in a clockwise direction to thereby cause the bifurcated link 54 to be lifted and the lift bar LB to be moved horizontally in an upwardly left-hand direction to lift the T-shaped coupler 35 out of the notch 46 or 47, as the case may be, of the door slide bar D, so that not only is the door unlocked from the door pilaster but it is also uncoupled from the operating slide bars O.

This procedure of using a key is presumably resorted to only when a particular door power operating mechanism is out of order as, for instance, a broken control wire and it is desirable to give either medical attention or food to a prisoner or release a particular prisoner or lock up a particular prisoner. After the key in the hands of a guard has performed its function the release master bar MB is returned to its "normal" position in which position all key holes are covered up by their respective key hole covers 67.

The procedure of manually and mechanically unlocking and uncoupling all doors by movement of the release master bar MB to the "unlock and uncouple all doors" position is probably only resorted to in the event it is desired to release all prisoners during failure of the entire electric equipment as, for instance, during power failure. Power failures do at times occur either because of broken lines either within the prison or at some outside point or because of insufficient power capacity at the power house. If this should occur at a time when all prisoners are to be released the release master bar would be moved to the "unlock and uncouple all doors" position, but if only one or a few prisoners are to be released or confined during power failure the key release would be used. In case of a prison fire, which might very easily occur concurrently with a power failure, the emergency release of all doors by movement of the release master bar to the extreme right-hand position would naturally be used.

*Control cabinet*

Referring to Figs 13, 14 and 15 a suitable cabinet 80 is preferably provided for housing the lever L, the master switch MS and each one of the individual switches IS, one for each door, as well as the indicating lamps I, one associated with each individual switch. This cabinet 80 is preferably provided with a door 81 which may at times be closed and locked, as required, so as to make the lever L, the individual switches IS, and the master control switch non-accessible except to authorized persons, such as, the guards and the warden. In practice this control cabinet is preferably located in a separate operating room located near the end of a cell block, but not provided with a door leading into the corridor so that it is virtually impossible for an inmate to get into this control room. As illustrated this control cabinet 80 is divided into three compartments, one of which houses the individual switches IS and the master control switch MS, another compartment of which contains the lower end of the lever L for operating the release master bar and also containing the master cut-out switch 83 which is in its open position when the door 81 is in its full closed position, and a third cabinet which contains the pivoted end of the lever L together with the spring operated detent 84 for holding the lever L in either its normal or its three operated positions and the key operated locks Y1 and Y2 which when locked define the limit of movement of the lever L toward the right. It is readily seen that movement of the lever L from its normal position will cause the roller 85 of the detent 84 to be urged out of its particular notch and to be ejected into another notch, as soon as the lever is moved to some other operative position, this through the medium of a spring (not shown) contained in the spring housing 86.

The key operated locks Y1 and Y2 may be of any suitable construction. They are preferably very rugged and preferably employ keys of widely different construction and if desired the lock Y1 may be constructed to be unlockable through the medium of key K illustrated in Fig. 7 this in order that the same key may be used to unlock the lever L insofar as movement of it to the "Key hole open" position is concerned and to use this same key for the operation of a particular cell door locking and coupling means. As shown each of these locks Y1 and Y2 is provided with a shank projecting downwardly through the horizontal position these shanks preferably contain the lock tumblers which are operable by a key which may be insertable from below so that these locks are accessible when the lever L is accessible. The lock bolt 88$^1$ of each lock is connected to lock bolt 88 by a coupling link 89. As is readily apparent from Figs. 13 and 14 although the lock bolt 88 when in locked position can prevent operation of the lever L in a right-hand direction from its normal position it permits the lever L to be moved freely toward the left-hand position. This is true because the lock bolt 88 does not pass through the lever L but passes to the right-hand side of this lever. Similarly, the lock bolt 88a operated by the lock Y2 when in locked position prevents operation of the lever L to the "unlock and uncouple all doors" position although this lever L may assume all other positions.

The door operated cut out switch 83 includes spaced contacts 110 normally closing a circuit through the contact ring 111. If the door 81 is closed it depresses the contact plunger 111—112 against the compression spring 114 through the medium of the adjustable cap screw 113 to thereby open such circuit (see Fig. 16) by movement of the plunger to a point where both contact fingers 110 rest on the insulating portion 112 of the plunger 111-112.

The master switch MS comprises a plurality of mercury contact tube racks 115 each carrying two contact tubes CTA and CTB (see Fig. 16) for each individual switch IS. Since there are four unitary switches arranged in each horizontal row (see Fig. 13) in the particular construction illustrated, there are eight such mercury contact tubes mounted on each of the racks 115. Each of the tubes CTA by being in the closed position determines that the door shall assume the closed position when the associated individual switch IS assumes the middle position; whereas its associated tube CTB by being in a circuit closed position determines that that door shall assume the open position when the associated individual switch assumes the middle position. Also all of the mercury contact tubes CTA assume the circuit closed condition when the master control handle assumes the upper door-closed position, whereas all the mercury contact tubes CTB assume the circuit closed condition when the master control handle assumes the lower door-open position. These racks are operatively connected together through the medium of the tie rod 87 and the lower rack is operatively connected to the handle MS through the medium of the link 118.

*Control and indication circuits*

Referring to Figs. 15 and 16 it will be seen that each door is provided with an individual control switch IS of which the individual control switches IS1, IS2 and IS3 only have been illustrated in Figs. 15 and 16, whereas additional control switches are shown in Fig. 13. As already stated there are associated with each individual control switch IS two mercury contact control tubes CTA and CTB (each designated by an exponent corresponding to the individual switch with which it is associated). As clearly shown in Fig. 15 and as conventionally shown in Fig. 16 the mercury contact control switches CTA and CTB are mounted on racks 115 which are connected by a tie bar 87, so that movement of the master control handle MS to one position will cause the mercury in each of these mercury tubes to flow to one end of the tube, whereas movement of the master lever MS to its other extreme position will cause the mercury in these tubes to run to the opposite end of the tube. These tubes are so arranged in their respective racks that movement of the master control lever MS to the closed position will cause the mercury in all of the control tubes CTA to assume the circuit closed position, whereas the mercury in all of the control tubes CTB assume the circuit open position, and similarly if the master control lever MS is moved to the door open position all of the mercury control contact tubes CTB will assume the circuit closed position, whereas the mercury control contact tubes CTA will assume the circuit open position.

Referring to Figs. 13 and 16 it will be seen that each individual control switch IS has associated with it an indicating lamp I designated by the same exponent as the suffix number of the associated switch. These indicating lamps I, one for each door, are connected in series with mercury tube indicating contacts ITA identified by the same suffix number as their associated individual control switches. These indicating mercury tube contacts ITA are illustrated in each of Figs. 2A, 3A, 10, 11 and 12. These mercury tube indicating contacts ITA are so operatively connected to the operating and locking mechanism that the mercury bridges the electrodes of the tube only if both the door is in its full closed position and the lock bolt is in its full locked position.

Referring again to Fig. 16 of the drawings adjacent each of the indicating tubes ITA is provided an indicating tube ITB. These indicating tubes ITB are operatively and mechanically connected with the tubes ITA so that the two tubes of a particular door will open or close their respective circuits simultaneously. All of the various indicating tubes ITB are connected in series in the same circuit including a master indicating light MI which is preferably located in the warden's office, so that the warden at all times can see whether all of the doors of a cell block are closed and locked. These indicating tubes ITB have been illustrated in Figs. 3A and 16. Each of the operating mechanisms is provided with two limit switches each comprising a mercury contact tube, these tubes have been designated TO and TC, the letters O and C designating that the tubes are in their open circuit condition when the door is respectively open or closed. The limit switches TC are illustrated in Figs. 3A and 16, whereas the limit switch TO is shown in Figs. 2B, 3B and 16.

Referring again to Fig. 16 of the drawings each of the motors M1, M2 and M3 is provided with two windings WC1 and WC2 which have one end thereof connected together and to a common return wire, whereas the other end of these respective windings WC1 and WC2 may be connected to a source of alternating current, one at a time, either through the medium of its respective individual switch IS or through the tubes CTA or CTB of the master control switch MS. These free ends of the windings WC1 and WC2 are connected by a condenser C, whereby if one of the windings, such as WC1 is directly energized by alternating current the other winding WC2 will be also energized but through the medium of the associated condenser C1, so that the current flowing in the windings WC1 and WC2 will be displaced in phase to produce a rotating magnetic field and to cause the operation of the motor WC1 and WC2 in a particular direction. Obviously, if energy is applied to the other winding WC2 the first mentioned winding WC1 will be energized through a circuit including the condenser C1 from which it is apparent that the phase relationship of the currents has been reversed causing the motor to be operated in the reverse direction.

The source of alternating current for operating the various motors M and illuminating the various indicating lamps I is derived from a transformer T having its primary winding connected to a suitable source of alternating current AC. In the warden's office conventionally illustrated by the dotted rectangle is preferably located a master cut-out switch MCO, which may be opened by the warden to remove all power from the control cabinet without removing current from his master indicating lamp MI. It is thus seen that the warden has supervisory control over the guard, who has control over the particular control cabinet illustrated. The door cut-out switch 83 illustrated in Figs. 14 and 16 is employed to remove all energy from both the individual control switches IS and the master control switch MS and from all of the indicating lamps I, exclusive of the master indicating lamp MI located in the warden's office. This feature is primarily an energy saving feature in that when the door 81 of the control cabinet is closed none of indicating lamps I can be seen and the energy flowing therethrough may be saved. This master cut-out switch 83 does, however, afford additional protection in that it prevents the flow of current to the motors of the various door operating mechanisms so that there is no danger of a door being opened by tampering with its control circuits.

Referring to Fig. 2A of the drawings within the cast iron casing 8 and bolted by bolts 90 to the left-hand wall thereof is a U-shaped bracket 91 for pivotally supporting the shaft 92 (see Fig. 9). This shaft 92 has secured thereto a crank 93 supporting at its free end a roller 94 (see also Fig. 2A). The other end of the shaft 92 has pinned thereto a bushing 95 containing two screw holes 96. Also secured fixedly to this shaft 92 and located between the fork of the U-shaped bracket 91 is a sleeve 98 carrying a double cam 99. The pin 53 passing through the free ends of the bifurcated lock operating link 54 extends out sufficiently far to operatively engage this double cam 99. To the outside of the bushing 95 and by screws threaded into the holes 96 a U-shaped tube rack 100 is fastened (see Fig. 2A). This tube rack 100 supports the indicating tubes ITA and ITB (see Fig. 3A) for indicating the closed and locked position of the door 1 heretofore described.

Referring now to Figs. 9, 10, 11 and 12 it will be seen that when the door is fully closed and the lock bolt is fully down (see Fig. 10) the pin 53 operating the lock bar operator 55 lies between the two cam members of the double cam 99 and that with the lock bolt 57 in its extreme lower and locked position the double cam 99 will rotate the shaft 92 and in turn rotate the tube supporting rack 100 to an extent to close the circuit through the mercury globule. Let us now assume that the door is moved by the power mechanism toward the door open position. Operation of the operating slide bars O toward the right will cause movement of these slide bars O in the lost motion slot 46 in the door slide bar D without movement of the door slide bar D. This will cause the cam 37 of the slide bar O1 to be moved to the right to an extent to lift the lock bolt operator 55 and simultaneously therewith will by the disengagement of the pin 53 from the right-hand cam member of double cam 99 allow the roller 94 by the force of gravity (see Fig. 10) to assume a lower position in engagement with the cam 49 as indicated in Fig. 11. Movement of the roller 94 to a lower position, as by gravity, will cause the double cam 99 to be tilted sufficiently to the left to open the mercury contact as indicated in Fig. 11. Continued movement of the operating slide bars O1 and O2 toward the right will cause the door slide bar D to be moved therewith because all of the lost motion has now been taken up. This movement of the cams 37 and 49 to the right will allow the roller 94 to drop to a still lower position as shown in Fig. 12 thereby rocking the double cam 99 to a position where it engages the stop pin 97 and where the pin 53 will fall to the right of the cam 99 and outside of the bifurcation of this double cam 99, so that this pin 53 in the dropped position will lock the double cam in a position to maintain the mercury contact open so long as the lock bolt is in its lower locked position with the cell door open.

A single mercury contact is thus mechanically operated by mechanism so that its mercury does not bridge the electrodes unless the door is both fully closed and fully locked. Furthermore this mechanism is so constructed that the lock bolt when in its lower locking position locks the cam 99 in either its indicating or its non-indicating position depending on whether the door is then fully closed or is open.

*Operation*

Let us first assume that the cell door 1 (see Figs. 1 and 3A) is in its closed and locked position and that the T-shaped coupler 35 is in a half raised position as would be the case when both the door and the operating mechanism are in their full closed position. The reason why the T-shaped coupler 35 is in a half raised position is because idle movement of the operating mechanism should be permitted after the operating mechanism has operated the door to the full closed position, this in order that preliminary movement of the operating mechanism toward the open position may be had when the door is again to be opened. During the last previous closing movement of the door 1 and its slide bar D by the power operating mechanism including the operating bars O the cross bar of the T-shaped coupler 35 assumed its horizontal position in the narrow slot 47 (see Fig. 3A), as the operating mechanism moved in a left-hand direction to close the door and when the door had been fully closed the back end (left-hand end in Fig. 8) of this cross bar of the T-shaped coupler 35 rode upon the cam 102 welded or otherwise secured to the back wall of the steel intermediate casing 10 (see Figs. 4A and 5A) and thereby lifted the coupler 35 far enough to get into the wide notch 46 to allow limited lost motion between the operating bars O and door slide bar D.

Let us now assume that the operator wishes to open the door 1 by the operation of the individual switch IS1 shown in Figs. 13 and 16. With the door 1 in its closed and locked position the limit switch mercury tube TO1 will be in its circuit closing position and the tube TC1 will be in its circuit opening position. Let us now assume that the operator moves the individual switch IS1 to its lower door opening position (as illustrated by the switch IS2). Under this condition of the switch IS1 current may flow from the secondary winding of the transformer T through the warden's switch MCO, through the lower switch blade of the individual switch IS1 through the limit contact mercury tube TO1 through the two windings WC1 and WC2 of the motor M1, with the current in one of these windings displaced in phase by reason of the condenser C1 contained in series therewith, through a common return wire passing through the door cut-out switch 83 back to the secondary winding of the transformer T. This will cause the motor M¹ to operate in a direction to turn the sprocket wheels 16 and 17 in a clockwise direction and in turn causing the operating slide bars 01 and 02 to be resiliently operated through the medium of a compression spring 39 and the chain 18 toward the right. Movement of the slide bars O1 and O2 as shown in Fig. 1 toward the right will cause the cam 37 of the operating slide bar O1 to be moved toward the right thereby lifting the roller 63 which in turn will disengage this roller 63 from the locking edge of the cam 49 on the door slide bar D and will also cause lifting of the lock bolt 57. When the operating slide bars O1 and O2 have been moved to the right to an extent permitted by the notch 46 in the door slide bar D the T-shaped coupler will also have been moved off of the lost motion cam 102, thereby allowing the T-shaped coupler to assume its dropped, horizontal and full-coupling position in the notch 47 of the door slide bar D. Continued movement of the operating slide bars O and the slide bar D toward the right will of course cause the door to be moved to its full-open position.

If the guard intended the doors to be left in their free and unlocked position when fully opened he will have moved his release master bar MB to its "unlock all open doors" position before he operated his individual control switch IS1. Under this latter condition the T-shaped coupler 35 will ride up on the Z-shaped kink MB¹ just before the door has reached its full open position, thereby uncoupling the door slide bar D, and in turn the door 1, from the operating mechanism including the operating slide bars O1—O2. When the operating mechanism reaches its full door open position the cam member 104 secured to the operating slide O1 (see Fig. 4B) will engage the cam member 105 (see Figs. 2B and 4C) to thereby tilt the mercury switch limit contact TO1 (see Figs. 2B and 3B) to its circuit open position (see Fig. 16) to thereby open the motor circuit of motor M1 and prevent further operation of the motor M1.

Let us now assume that the operator wishes to return the door 1 to its closed position through the medium of the power operating mechanism and that in order to accomplish this he moves his individual control switch IS1 (see Fig. 16) to its upper position (as illustrated for individual control switch IS3). This will close a circuit through the upper blade of the individual control switch IS1 and through the limit switch TC1 to energize the motor M1 to cause it to be operated in an opposite and a door closing direction. Movement of the operating slide bars toward the left will of course cause the cam 104 to disengage the cam 105 to allow return of the mercury contact limit switch TO1 to its circuit closing position. Also, this movement of the operating slide bars O1 and O2 toward the left causes the T-shaped coupler to engage the wide notch 46 in the door slide bar D by movement of this coupler 35 off of the kink MB¹ in the release master bar MB, so that movement of the operating mechanism including the operating bars O toward the left will carry the door slide D and the door 1 with it. In this case lost motion will exist between the operating bar O and the door slide bar D because the T-shaped coupler is located in the lost motion slot 46 rather than in the restricted slot 47 in the door slide bar D. If, however, an inmate should attempt to shake the door with respect to its operating mechanism while it is being moved in a closing direction the first movement of the door in a door closed direction will cause the T-shaped coupler to fall into the restricted notch 47, thereby removing all lost motion between the operating slide bars O and the door slide bar D until the door has almost reached its closed position. In this latter case if the inmate would shake the door he would thereby cause the lost motion to be removed by the dropping of the T-shaped coupler 35 into the restricted slot 47. This lost motion will, however, again be rendered available by the T-shaped coupler 35 being lifted by the lost motion cam 102 after the door has reached its full closed position and during supplemental movement of the operating mechanism to a point where the cam 37 has fully dropped the lock bolt 57. It may be pointed out and is readily apparent from Fig. 4A of the drawings that power movement of the door to its closed position will cause the lock bar 57 to be lifted to its unlocked position by the cam 37 of the operating slide O1, whereas closing movement of the door by hand will cause this lock bolt 57 to be lifted by the tapered end of the cam 49 constituting part of the door slide bar D. As the door operating mechanism, and particularly the operating bar O1, reaches its full door closed position the lock bolt 57 will drop and the cam 43 will engage the cam 106 to thereby rock the mercury contact limit switch TC1 (see Figs. 3A and 16) to the circuit open position, thereby opening the circuit to the motor M1 to stop the motor M1 and prevent possible damage to the mechanism by further operation of this motor.

Had the guard returned his lever L to the "normal" position before he operated the individual control switch IS1 the T-shaped coupler would have dropped into the restricted notch 47 in the door slide bar D, in which even subsequent operation of the door by power to the closed position would have taken place without lost motion between the T-shaped coupler 35 and the door slide bar D.

Let us now assume that the guard wishes to open a particular door only, namely, the door 1 shown in Figs. 1 and 3A of the drawings, and that in order to do so he moves his lever L to the "key hole open" position (see Figs. 1 and 14). By such movement of the lever L the key hole cover 67 will open the key hole 70 for door 1 to enable the guard to insert the key K, illustrated in Fig. 7 of the drawings, into the key hole. The guard may now insert this key K and rock the shaft 52 to the right-hand direction thereby causing the release bell crank 51 to be rotated in a clockwise direction resulting in the lifting of the lock bolt 57 through the medium of the lock bar bifurcated link 54 and to also result in movement of the lift bar LB in a left-hand upwardly direction by substantial parallel movement to thereby cause this lift bar LB to lift the T-shaped coupler 35 out of the notches 46 and 47 of the door slide bar D irrespective of the position assumed by the bars O and D at that time. This will, of course, not only unlock the door 1 from its door pilaster, but will also unlock the door slide bar by the lifting of the roller 63 from behind the lock edge of cam 49, and will simultaneously therewith uncouple the door slide bar D from the operating slide bars O, so that the door may be moved freely to any position by hand. If, however, the guard removes his key the lock bolt will again return to its locked position and will carry with it the release bell crank 51 and the lift bar LB, so that if thereafter the door is closed by hand it will be firmly locked to the pilaster at two points, namely, at the staple 60 and at the straight locking edge of the cam 49 of the door operating slide bar D. If thereafter the power operated mechanism including operating slide bars O, is returned to the door closed position the T-shaped coupler 35 will snap into coupling position when it comes over the notch 46—47 after which the door is again coupled to its operating mechanism.

Let us now assume that the guard wishes to unlock all of the doors in the cell block. To accomplish this result he will move the lever L to the "unlock and uncouple all doors" position. This operation of the release master bar MB will not only rock the release bell crank 51 of the particular cell door 1 illustrated, but will rock all of the release bell cranks 51 in a clockwise direction to thereby lift all lock bolts 57 to unlock all doors and release all T-shaped couplers to uncouple all doors from their operating mechanisms in the same manner as has just been explained in connection with the key operation of the release bell crank 51 for the door 1.

*Modification Figs. 17–22*

In Figs. 17 to 22, inclusive, has been illustrated a modified construction of cell door operating and locking mechanism in which all of the elements which have not been illustrated are the same and function the same as those illustrated in Figs. 1 to 16, inclusive.

In this modified construction instead of employing two cast iron casings 8 and 9 connected by a sheet steel casing 10, all three casings are cast integral and comprise a single cast iron casing 120. Referring to Fig. 19 a cross section of the left-hand end of this cast iron casing 120 has been illustrated. The back wall of this casing 120 is provided with projections or lugs 120ª so that as this casing is bolted against the steel wall 121 above the door it will be spaced from the wall a distance to allow sliding room for a main master bar MMB. The left-hand end of this casing 120 is provided with an opening 120ᵇ, of the casing 120, through which the master bar MB may slide. To the left-hand end of the casing 120 and over the opening 120ᵇ is welded a guide plate 122, which as shown in Fig. 20 is machined to afford sliding surfaces for both the master bars MMB and MB. A similar plate (not shown) is welded to the right-hand end of the casing 120 more particularly to afford guides for the main master bar MMB to slide in. The main master bar MMB has suitably fastened thereto, as by welding, a spacer plate 123. This spacer plate as well as the main master bar MMB is perforated to provide a bearing for the pin 124 riveted into the end of the master bar MB, as best shown in Fig. 17. It is readily seen that by this construction the casing 120, with the master bar MB slidably mounted therein, may be removed from the wall without in any way disturbing the main master bar MMB, the pin 124 sliding freely out of the opening contained in the spacer plate 123 and the main master bar MMB.

In this modified construction shown in Figs. 17 to 22, inclusive, the master bar MB performs exactly the same functions as it does in the preferred construction shown in Figs. 1 to 16, inclusive, and the main master bar MMB performs no function other than the function of operating the master bar MB. The key hole cover is however of modified construction and for that reason the operating connection between the master bar MB and the key hole cover 125 is also of modified construction. The key hole cover 125 does not contain a key hole but bodily moves out of registration with the key hole 70 shown in Fig. 1. This key hole cover 125 is pivoted about a pin 127 (see Figs. 17 and 18) which pin is riveted into a key hole cover guard 128 (see Fig. 17). The free end of this key hole cover 125 is bifurcated and bent substantially at right angles to the plane in which the key hole cover may swing. This bent-over portion forms two ears 125ª and 125ᵇ between which an operating arm 130 may engage to form an operative connection. This operating arm or leaf spring 130 is fastened to a hub 131 as by a rivet 132 (see Fig. 17), this hub 131 being fastened to a shaft 133 pivotally supported in the casing 120. This shaft 133 passes through the back wall of the casing 120 and is provided at its back end with a head or nut 133ª. Just to the inside of the back wall of the casing 120 and fixedly secured to this shaft 130, as by welding, is a two-legged cam 135. This two legged cam 135 may be considered to be a two tooth pinion which is operatively connected to a single tooth rack forming part of the master bar MB of which the single tooth is designated MBª.

Referring now to Figs. 21 and 22 it will be observed that the master bar MB is illustrated in four different positions. The extreme left-hand or first position, which is the solid line position of Fig. 21, illustrated the master bar MB and the two legged cam 135 in the "unlock all open doors" position, whereas the dotted lines in Fig. 21 illustrate the two legged cam and the master bar in their second or "normal" positions. It will be seen that the two legged cam 135 shifts very little during movement of the master bar MB from the normal to the "unlock all open doors" position. Referring now to Fig. 22 it is desired to point out that the dotted lines illustrate the master bar MB and the two legged cam 135 in the third or "key hole open" position and that a substantial arc of movement of the two legged cam 135 has taken place during movement of the master bar from the "normal" position to this "key hole open" position. The solid lines of Fig. 22 show the master bar MB and the two legged cam 135 in the fourth or "unlock and uncouple all doors" position.

Rotation of the shaft 133 through the medium of the two legged cam 135 in a counterclockwise direction as shown in Figs. 21 and 22 will result in the rotation of the key hole cover 125 in a clockwise direction as shown in Fig. 18. In other words, in Figs. 21 and 22 we are looking directly into the casing 120 from the key hole side, whereas in Fig. 18 we are looking outwardly from the casing 120.

Attention is particularly directed to the fact that the key hole cover guard 128 not only serves as a guard to hold the key hole cover plate 129 in close proximity with the mechanism cover, shown at 64 in Fig. 1 and containing a key hole 79, to which the key hole cover guard 128 is welded, but it also serves as a stop means to limit the rotation of the key hole cover 125 through a predetermined angle about the rivet pin 127. Attention is also directed to the fact that the ears 125ª of the key hole cover 125 are tapered, as best shown in Fig. 20. This is done so that if the mechanism cover 64, to which the key hole cover 125 and key hole cover guard 128 are fastened, is put back in place after having been removed, and when so replaced has the key hole cover 125 out of registration with the leaf spring 133, the operation of the main master bar MMB thereafter from one extreme end to the other extreme end of its possible motion will result in movement of the spring arm 130 over one or the other of the ears 125ª as a result of which the spring arm 130 snaps back into its original position into operative engagement with the two ears on the key hole cover 125.

It is thus seen that the modified construction illustrated in Figs. 17 to 22, inclusive, enable the entire operating mechanism to be removed from one of the cell doors without in any way interfering with the main master bar MMB which extends the full length of a cell block, and similarly such a door operating and locking mechanism may again be returned to its original position without tediously making an operative connection between its master bar MB and the master control lever located at the end of the cell block. Also, the key hole cover structure illustrated in Figs. 17 to 22, inclusive, is of a construction which is not apt to cause binding action during operation of the master bar MB.

Having thus shown and described one embodiment of the present invention, having some of its elements of several modified constructions, it should be understood that the specific constructions illustrated and described have been resorted to for the purpose of illustrating the nature of the invention and to facilitate its description and the description of its operating functions, and it should be understood that modifications, additions and changes may be made without departing from the spirit of the invention except as demanded by the scope of the following claims.

What I claim as new is:

1. Prison door operating and locking means comprising in combination, a casing, two operating bars of general rectangular cross-section standing on edge one against the other and mounted for horizontal endwise movement in said casing either separately or together, one of said bars being notched at the top, a coupling member pivotally connected to the other of said bars to engage the notch of said one bar when said coupling member assumes its active condition and said bars are in registration, the engaging portion of said coupling member being narrower than said notch to afford lost motion, a door, means for operatively connecting said door to said one bar for sliding movement therewith, a motor which may be operated in either of two directions, a lock bolt, means for operating said lock bolt to its unlocking position operated by said other bar as permitted by said lost motion before said coupling member operates said one bar during opening movement of said other bar, and interconnecting mechanism between said motor and said other bar whereby said motor may operate said other bar and in turn said one bar and said door through the medium of said coupling member, said interconnecting mechanism being constructed so that said motor can operate said other bar but said other bar cannot operate said motor, whereby said door may be operated by said motor and inter-connecting mechanism to any position and held in that position, may be locked by said lock bolt in the closed position, or may be released for hand operation by disengagement of said coupling member.

2. Prison door operating and locking means comprising in combination, a casing having an opening at the top and partly filled with oil, two operating bars of general rectangular cross-section standing on edge one against the other and mounted for horizontal endwise movement in said casing either separately or together, one of said bars being notched at the top, a coupling member pivotally connected to the other of said bars to engage the notch of said one bar when said coupling member assumes its active condition and said bars are in registration, a door supported by rollers outside of said casing, means extending through said opening for operatively connecting said door and its rollers to said one bar for sliding movement therewith, a motor which may be operated in either of two directions, and interconnecting mechanism between said motor and said other bar lubricated by said oil whereby said motor may operate said other bar and in turn said one bar and said door through the medium of said coupling member, said interconnecting mechanism being constructed so that said motor can operate said other bar but said other bar cannot operate said motor, whereby said door may be operated to any position and held there or may be released for hand operation.

3. Prison door operating and locking means comprising in combination, a casing, two operating bars of general rectangular cross-section standing on edge one against the other and mounted for horizontal endwise movement in said casing either separately or together, one of said bars being notched at the top by a wide notch having a narrow notch in the bottom thereof, a coupling member pivotally connected to the other of said bars to engage either side wide or said narrow notch of said one bar when said coupling member assumes its active condition and said bars are in registration to make either a positive or a lost motion connection between said bars, a door, means for operatively connecting said door to said one bar for sliding movement therewith, locking means operable by said other bar when said coupling means engages said wide notch, a motor which may be operated in either of two directions, interconnecting mechanism between said motor and said other bar whereby said motor may operate said other bar and in turn said one bar and said door through the medium of said coupling member, said interconnecting mechanism being constructed so that said motor can operate said other bar but said other bar cannot operate said motor, whereby said door may be operated to any position and held there or may be released for hand operation, and means controlled from a remote point for placing said coupling member in either its active or its inactive condition.

4. Prison door operating and locking means comprising in combination, a casing having an opening at the top and partly filled with oil, two operating bars of general rectangular cross-section lubricated by said oil and standing on edge one against the other and mounted for horizontal endwise movement in said casing either separately or together, one of said bars being notched at the top, a coupling member pivotally connected to the other of said bars to engage the notch of said one bar when said coupling member assumes its active condition and said bars are in registration, a door, rollers for supporting said door rolling on a track outside of said casing, means extending through said opening for operatively connecting said door and its rollers to said one bar for sliding movement therewith, a motor which may be operated in either of two directions, interconnecting mechanism between said motor and said other bar whereby said motor may operate said other bar and in turn said one bar and said door and rollers through the medium of said coupling member, said interconnecting mechanism being constructed so that said motor can operate said other bar but said other bar cannot operate said motor, whereby said door may be operated to any position and held there or may be released for hand operation, and means controlled from a remote point for placing said coupling member in either its active or its inactive condition.

5. In a prison door operating and locking mechanism, a unitary power operated structure for each of a plurality of doors each comprising, a pair of operating slide bars positioned for longitudinal sliding movement, said bars being fastened together in spaced relation by two spacers, a third bar having enlarged ends and mounted for longitudinal sliding movement between said bars and in holes in said spacers, a spring around said third bar confined under initial compression between members engaging said spacers, said third bar being provided with enlarged ends for engaging said members to cause compression of said spring whenever said third bar is moved in either direction relative to said pair of slide bars by forces in excess of initial compression of said spring, whereby said third bar is resiliently reciprocately mounted for endwise movement between said pair of operating slide bars, a prison door of the sliding type, connecting means for operatively connecting said pair of operating slide bars to said door, a sprocket, a motor for driving said sprocket in either direction, an idling roller, and a chain having its ends fastened to the ends of said third bar and meshing with the teeth of said sprocket and said idling roller, whereby said motor driven sprocket can operate said door resiliently in either direction through the medium of said spring.

6. In a prison door operating and locking mechanism, a unitary power operated structure for each of a plurality of doors each comprising, a pair of slide bars each of general rectangular cross-section positioned for longitudinal sliding movement on one edge, said slide bars being fastened together in spaced relation by two spacers, a third bar having enlarged ends mounted for sliding movement in holes in said spacers and between said bars, a spring means including a spring under initial compression surrounding said third bar, said spring means being sufficiently large so as not to pass through the holes in said spacers and having holes sufficiently small not to pass over the enlarged ends of said third bar, whereby said third bar is mounted for resilient endwise movement between said pair of operating slide bars, a prison door of the sliding type, connecting means for operatively connecting said pair of slide bars to said door, a motor driven sprocket, an idling roller, a chain having its ends fastened to the ends of said third bar and meshing with the teeth of said motor driven sprocket and said idling roller, whereby said motor driven sprocket can operate said door resiliently in either direction through the medium of said spring, and means controlled from a distant point for rendering said connecting means ineffective to allow said door to be closed or opened by hand.

7. Prison door operating and locking means comprising in combination, a casing partly filled with oil and having a longitudinal opening on one side thereof above the level of said oil, two operating bars of general rectangular cross-section lubricated by said oil and standing on edge one against the other in said casing and mounted for horizontal endwise movement in said casing either separately or together, one of said bars being notched at the top, a coupling member pivotally connected to the other of said bars to engage the notch of said one bar when said coupling member assumes its active condition and said bars are in registration, a door, supporting means outside of said casing for supporting said door for sliding movement, means for operatively connecting said door and its supporting means to said one bar for sliding movement therewith, a motor which may be operated in either of two directions, and interconnecting mechanism between said motor and said other bar including a chain passing over two sprockets and fastened to said other bar whereby said motor may operate said other bar and in turn said one bar, said door supporting means and said door through the medium of said coupling member, said interconnecting mechanism also including worm reduction gearing so that said motor can operate said other bar but said other bar cannot operate said motor, whereby said door may be operated to any position and held there or may be released for hand operation.

8. Prison door operating and locking means comprising in combination, an elongated casing having a slot near the top at one side thereof and partly filled with oil, two operating bars of general rectangular cross-section lubricated by said oil and standing on edge one against the other and mounted for horizontal endwise movement in said casing either separately or together, one of said bars being notched at the top, a coupling member pivotally connected to the other of said bars to engage the notch of said one bar when said coupling member assumes its active condition and said bars are in registration, a door, rollers for supporting said door and rolling on a track outside of said casing, means extending through said slot in said casing for operatively connecting said door and its rollers to said one bar for sliding movement therewith, a motor which may be operated in either of two directions, and interconnecting mechanism between said motor and said other bar whereby said motor may operate said other bar and in turn said one bar and said door through the medium of said coupling member, said interconnecting mechanism being constructed so that said motor can operate said other bar but said other bar cannot operate said motor, whereby said door may be operated to any position and held there or may be released for hand operation.

9. Prison door operating and locking mechanism comprising in combination, a casing, two operating bars of general rectangular cross-section standing on edge spaced apart and mounted for horizontal edgewise movement in said casing, a third bar of similar rectangular cross-section also standing on edge against one of said operating bars for sliding movement either separately or with said two operating bars, said bars being notched to receive a latch by notches which are in alignment when the bars are in alignment, a coupling member pivotally connected between said two operating bars to engage the notches of all of said bars when said coupling member assumes its active position and said bars are in registration, a door, means for operatively connecting said door to said third bar for sliding movement therewith, a motor which may be operated in either of two directions, interconnecting mechanism between said motor and said two operating bars including a chain, whereby said motor may operate said operating bars and in turn said three bars and said door operatively connected thereto through the medium of said coupling member, said interconnecting mechanism including a worm reduction gearing so that said motor can operate said operating bars but said operating bars cannot operate said motor, whereby said door may be released for hand operation by the turning of said coupling member about its pivot, and means controlled from a remote point for placing said coupling member in either its active or its inactive position.

10. Prison door operating and locking means comprising in combination, a casing having a horizontal slot near the top along one side thereof and partly filled with oil, two operating bars of general rectangular cross-section standing on edge one against the other and mounted for horizontal endwise movement in said casing either separately or together, one of said bars being notched at the top, a coupling member pivotally connected to the other of said bars to engage the notch of said one bar when said coupling member assumes its active condition and said bars are in registration, a door, means extending through the slot of said casing for operatively connecting said door to said one bar for sliding movement therewith, a motor which may be operated in either of two directions, interconnecting mechanism between said motor and said other bar including a chain partly immersed in said oil whereby said motor may operate said other bar and in turn said one bar and said door connected thereto through the medium of said coupling member, said interconnecting mechanism including a worm reduction gearing so constructed that said motor can operate said other bar but said other bar cannot operate said motor, and means controlled from a remote point for placing said coupling member in either its active or its inactive condition, whereby said door may be operated to any position and held there by said reduction gearing or may be released for hand operation.

11. In a prison door operating and locking mechanism, a unitary power operated structure for each of a plurality of doors each comprising, a casing partly filled with oil, a pair of operating slide bars positioned for longitudinal sliding movement in said casing, said bars being fastened together in spaced relation by two spacers, a third bar having enlarged ends and mounted for sliding movement in holes in said spacers and between said bars, a helical coil spring compressed under initial compression surrounding said third bar and having means at its ends sufficiently large so as not to pass through the holes in said spacers and sufficiently small not to pass over the enlarged ends of said third bar, whereby said third bar is resiliently mounted for endwise movement between said pair of operating slide bars only by forces in excess of said initial compression, a prison door of the sliding type, connecting means for operatively connecting said pair of operating slide bars to said door, a driven sprocket, a motor for driving said sprocket, an idling roller, and a chain partly immersed in said oil having its ends fastened to the ends of said third bar and meshing with the teeth of said driven sprocket and passing over said idling roller, whereby said driven sprocket can operate said door resiliently in either direction through the medium of said spring.

12. In a prison door operating and locking mechanism, a unitary power operated structure for each of a plurality of doors each comprising, a pair of operating slide bars positioned for longitudinal sliding movement, said bars being fastened together in spaced relation by two spacers, a third bar having enlarged ends and mounted for sliding movement in holes in said spacers and between said bars, a helical coil spring under initial compression surrounding said third bar, members between the ends of said spring and said spacers sufficiently large so as not to pass through the holes in said spacers and having holes sufficiently small not to pass over the enlarged ends of said third bar, whereby said third bar is resiliently mounted for endwise movement between said pair of operating slide bars, a prison door of the sliding type, a fourth bar arranged for endwise movement in parallel relation with said pair of operating slide bars, connecting means for operatively connecting said pair of operating slide bars to said fourth bar, means for operatively connecting said fourth bar to said door, a motor driven sprocket, an idler, a chain having its ends fastened to the ends of said third bar and meshing with the teeth of said motor driven sprocket and engaging said idler, whereby said motor driven sprocket can operate said door resiliently in either direction through the medium of said spring, and means controled from a distant point for rendering said connecting means ineffective to allow said door to be closed or opened by hand.

13. In a prison door operating and locking mechanism, a unitary power operated structure for each of a plurality of doors each comprising, a pair of operating slide bars each of general rectangular cross-section positioned for longitudial sliding movement on one edge, said bars being fastened together in spaced relation by two spacers, a third bar having enlarged ends and mounted for sliding movement in holes in said spacers and between said bars, a helical coil spring means under initial compression surrounding said third bar and sufficiently large in diameter so as not to pass through the holes in said spacers and having a central opening sufficiently small not to pass over the enlarged ends of said third bar, whereby said third bar is resiliently mounted for endwise movement between said pair of operating slide bars only by forces in excess of said initial compression, a prison door of the sliding type, a fourth bar arranged for endwise movement in parallel relation with said pair of operating slide bars and having a notch in the top edge thereof, connecting means including a coupling member pivoted between said pair of operating bars and having a latch portion entering into said notch when said fourth bar and said pair of operating bars are in registration for operatively connecting said pair of operating slide bars to said fourth bar, means for operatively connecting said fourth bar to said door, a driven sprocket, an idler, a chain having its ends fastened to the ends of said third bar and meshing with the teeth of said driven sprocket and engaging said idler, whereby said driven sprocket can operate said door resiliently in either direction through the medium of said spring, and means controlled from a distant point for rendering said connecting means ineffective to allow said door to be closed or opened by hand.

14. In combination, a plurality of prison cells arranged in a row, a door for each cell, a mechanism housing over each door, a master release bar extending the full length of said plurality of cells to the rear and outside of the mechanism housings of said cells, an individual release bar in each of said mechanism housings detachably conected to said master release bar by a detachable connection, a door slide bar in each of said housings operatively connected to its associated door, a motor driven operating slide bar adjacent each door slide bar, coupling means supported by one of said bars and when active engaging a notch in the other of said bars, and means operated by said master release bar and through the medium of the individual release bar for rendering said coupling means active or inactive, whereby the coupling means in each mechanism housing may be operated by the master release bar and whereby a particular mechanism housing with its mechanism may be removed as afforded by said detachable connection without severing the connections between said master release bar and the retained mechanism housings.

15. In combination, a plurality of prison cells arranged in a row, a door for each cell, a housing over each door, a door slide bar in each housing operatively connected to its associated door, an operating slide bar adjacent each door slide bar for endwise parallel movement in said housing with or independently of said door slide bar in such housing, coupling means in each housing for when active coupling the door slide bar and operating slide bar together but affording lost motion, a reversible motor supported by each housing for operating said operating slide bar in one direction or the other depending on the direction of rotation of said motor, a lock bolt for each door which when in a dropped position when such door is closed locks said door, means for lifting said lock bolt when the associated operating slide bar is moved from its closed position as permitted by said lost motion, an individual release slide bar in each of said housings which when in its active position lifts the associated lock bolt and disengages the associated coupling means, and a master release bar extending the full length of said row of cells and outside of said housings and detachably connected to each of said individual release bars, whereby any particular mechanism housing may be easily removed without in any way interfering with the operation and functioning of said master release bar upon the individual release bars in other mechanism housings.

16. In combination; an elongated casing horizontally disposed; a partition near one end in said casing extending only part way up from the bottom thereof; a hole in the bottom of said casing beyond said partition with respect to the middle of said casing; oil in said casing to a level just below the top of said partition; an operating bar, a door slide bar, a lift bar and a release bar all arranged side by side in said casing and positioned above the level of the top of said partitions; a chain for reciprocating said operating bar, said chain being partly immersed in said oil; rollers on which said bars may rest immersed partly in said oil, a lock bolt disposed vertically in said hole, means operated by said door slide bar for at times lifting said lock bolt, a coupling member for when active coupling said operating bar to said door slide bar, means operable by said lift bar for operating said coupling member to its inactive condition, and means operated by said release bar for lifting said lock bolt and operating said coupling member to its inactive condition.

17. In combination; an elongated casing horizontally disposed; a partition near one end in said casing extending only part way up from the bottom thereof; a hole in the bottom of said casing beyond said partition with respect to the middle of said casing; said casing containing oil to a level just below the top of said partition; an operating bar, a door slide bar, a lift bar and a release bar all arranged side by side in said casing and positioned above the level of the top of said partitions; driving means including a reversible motor for reciprocating said operating bar, said driving means including movable elements partially immersed in the oil in said casing and acting to distribute oil to said bars, a lock bolt disposed vertically in said hole, means operated by said door slide bar for at times lifting said lock bolt, a coupling member for when active coupling said operating bar to said door slide bar, means operable by said lift bar for operating said coupling member to its inactive condition, and means operated by said release bar for lifting said lock bolt and operating said coupling member to its inactive condition.

18. In combination, a unitary power mechanism for operating and locking prison cell doors, an elongated casing partly filled with oil, an operating slide bar and a door slide bar arranged side-by-side for endwise movement in said casing the top edge of one of said bars being notched, a coupling member pivoted to the other of said bars and engageable in said notch when in an active condition and when said bars are in alignment and when in engagement with said notch constituting a lost motion connection between said bars, a prison door operatively connected to said door bar, a lock bolt for when in its lower position with said door in its closed position locking said door, means operated by said operating bar during movement of said operating bar in the door opening direction as afforded by said lost motion for lifting said lock bolt, a reversible motor and non-reversible gearing for operating said operating slide bar, and manually operable means for lifting said coupling member out of said notch.

19. In combination, a unitary power mechanism for operating and locking prison cell doors, an elongated casing partly filled with oil, an operating slide bar and a door slide bar arranged side-by-side for endwise movement in said casing the top edge of one of said bars being notched, a coupling member pivoted to the other of said bars and engageable in said notch when in an active condition and when said bars are in alignment and when in engagement with said notch constituting a lost motion connection between said bars, a prison door, means above the top of said oil for operatively connecting said door bar to said prison door, a lock bolt for when in its biased position with said door closed locking said door, means operated by said operating bar during movement of said operating bar in the door opening direction as afforded by said lost motion for operating said lock bolt against its bias, a reversible motor and non-reversible gearing for operating said operating slide bar, and manually operable means for operating said lock bolt against its bias and operating said coupling member out of said notch.

20. In a unitary mechanism for operating a prison cell door, the combination of an elongated casing partly filled with oil and having an elongated opening above the level of said oil in one side of said casing, a slide bar in said casing, rollers in said casing supported on spindles and having their lower extremities dipping into said oil to support and lubricate said slide bar, non-reversible gearing also lubricated by said oil, a reversible motor for operating said slide bar in opposite directions through the medium of said gearing but not permitting rotation of said motor by movement of said slide bar, a prison door supported for sliding movement below said casing, and a connecting member extending through said opening and connecting said slide bar to said door, whereby lubrication of said slide bar and gearing is afforded without the necessity of an oil seal.

21. In combination, a casing for housing mechanism for operating and locking prison cell doors, a member in said casing operable from a remote point to a keyhole-closed and a keyhole-open position, a removable front cover for said casing having a keyhole therein, a keyhole cover movably mounted and secured to the inside of said cover to be operable to a position to close said keyhole or to open said keyhole, and means operatively connecting said keyhole cover and said member and including disengageable cooperating elements to enable said front cover and its associated keyhole cover to be readily removed.

22. In combination, a casing for housing mechanism for operating and locking prison cell doors, a member in said casing operable to a keyhole-closed and a keyhole-open position, a removable cover for said casing having a keyhole therein, a movable keyhole cover secured to the inside of said cover to be operable to a position to close said keyhole or to leave it open, a spring latch secured to said member, and ears projecting from said keyhole cover to allow said spring member to operatively engage between the ears of said keyhole cover upon movement of said member, whereby if the keyhole cover was in non-correspondence relation with said member when said cover was last applied to said casing, the operation of said member to a position in correspondence with said cover will automatically establish an operative connection between said member and said keyhole cover.

23. In combination, a casing for housing apparatus for operating and locking prison cell doors, a slide bar in said casing which may assume a keyhole-open or a keyhole-closed position, a shaft in said casing operatively connected to be rotated by said slide bar as said slide bar is longitudinally moved from one position to another, a spring latch member secured to said shaft, a removable cover for said casing having a keyhole therein, a keyhole cover pivotally secured to the inside of said first mentioned cover and rotatable to a position to either close or open said keyhole, and spring-pressed means secured to said shaft and operatively engageable into a notch of said keyhole cover, whereby if said cover is applied to said casing with the keyhole cover out of registration with said shaft said keyhole cover will be operatively connected to said shaft automatically upon rotation of said shaft to a corresponding position.

24. In combination with a plurality of prison cells in a cell block; a door for each cell, power operated mechanism for each cell for operating, locking and unlocking its associated door by power applied to said mechanism from a remote point; a keyhole cover; a master bar extending the full length of said cell block and manually operable from a remote point for in one position coupling such power operated mechanism to such door and allowing operation of such door by its power operated mechanism to unlock said door and move it to the open position or operate it to the closed position and lock such door, for in a second position to cause each door to be uncoupled from its power operated mechanism when the door has been operated by its power operated mechanism to the full door-open position, for in a third position to operate said keyhole cover to a keyhole-open position to allow uncoupling of any door from its power operated mechanism by a key and for in a fourth position to unlock all doors and uncouple all doors from their respective power operated mechanisms.

25. In combination with a prison cell and door; a mechanism casing partly filled with oil and having a longitudinal horizontal slot above the level of such oil; a door for said cell mounted below said mechanism casing for sliding movement substantially parallel to said casing; a power operated mechanism in said casing for operating and locking said door by power; a shallow arm projecting through said slot and operatively connecting said door to said power operated mechanism; and a cover for said slot which cover is opened by said arm during movement of said power operated mechanism from the door-open position to the door-closed position or from the door-closed position to the door-open position and which is closed to cover said slot when said door assumes either the fully-closed or the fully-open position.

26. In combination with a prison cell and door; a mechanism casing partly filled with oil and having a longitudinal horizontal slot above the level of such oil; a door for said cell mounted below said mechanism casing for sliding movement substantially parallel to said casing; a power operated mechanism in said casing for operating and locking said door by power; a shallow arm projecting through said slot and operatively connecting said door to said power operated mechanism; and a cover for said slot having a notch near each end at the lower edge thereof corresponding in shape and dimensions to said arm, which cover is opened by said arm during movement of said power operated mechanism from the door-open position to the door-closed position or from the door-closed position to the door-open position and which is closed to cover said slot by having one of said notches embrace said arm when said door assumes either the fully-closed or the fully-open position.

27. In combination with a prison cell and door of the sliding type, a power operated reciprocal mechanism for each door having an operating bar reciprocal along a line parallel to the line of movement of said door, means including a spring link for mechanically connecting said reciprocal operating bar to said door, a friction slip clutch, a reversible electric motor for operating said bar through the medium of said slip clutch and spring link, a limit switch for opening the operating circuit for said motor when said operating bar assumes the extreme door-closed or door-open position; whereby the momentum of the rotor of said motor upon opening of said limit switch if small is absorbed by said spring link and if large is absorbed by the slipping of said slip clutch.

28. In combination with a prison cell and door of the sliding type, a power operated reciprocal mechanism for each door having an operating bar reciprocal along a line parallel to the line of movement of said door, means including a spring link having an initially compressed spring compressed to a predetermined compression for mechanically connecting said reciprocal operating bar to said door, a friction slip clutch, a reversible electric motor for operating said bar through the medium of said slip clutch and spring link, a limit switch for opening the operating circuit for said motor when said operating bar assumes the extreme door-closed or door-open position; whereby the momentum of the rotor of said motor upon opening of said limit switch if small but in excess of said initial compression is absorbed by said spring link and if large enough to slip said friction slip clutch is absorbed by the slipping of such slip clutch.

29. An indication contactor for actuating an indicator in the circuit of which it is included to render said indicator active only if a door is fully closed and locked, comprising an arm pivoted to move about a center and biased to an inactive position, circuit closing means operatively connected to said arm, a vertically movable locking element, a horizontally movable door element, means for moving the free end of said arm about its pivot in the path of movement of said locking element when said door element is moved to the door-closed position, and means for moving said arm in the same direction about its pivot and to its active position when said locking element is moved to its locking position while said arm was in the path of movement of said locking element.

30. In a prison cell door operating and locking structure, the combination with a prison wall above a door opening, a sliding door movable over said door opening, a mechanism casing having a groove in its back wall secured to the prison wall and above the door opening, operating and locking mechanism in said casing, a release bar mounted in said casing for endwise horizontal slidable movement therein for causing coupling and locking functions dependent on the sliding position assumed by said bar, and a master bar extending the full length of a cell block slidably supported in the grooves in the back walls of the mechanism casings of such cell block detachably operatively connected to the release bars in each of said mechanism casing, whereby any mechanism casing and its release bar may be removed without disturbing the operative connection between any other release bar and said master bar.

31. In a prison door operating and locking structure, the combination with a mechanism casing for housing prison door operating and locking mechanism, release mechanism including a key operated release member projecting from said casing which member when operated to its release position disconnects operating mechanism in said casing from its associated prison door, a removable chase-way cover in front of said casing and having a keyhole in alignment with said release member, a keyhole cover pivotally secured to the inside of said chase-way cover to move in a plane parallel to said chase-way cover, a keyhole cover operating shaft projecting from said mechanism casing and coaxial with the pivot of said keyhole cover, ears on said keyhole cover, and spring means secured to said cover operating shaft and engaging said keyhole cover between said ears, whereby said chase-way cover may be removed without interference by the operative connection between said keyhole cover and its operating shaft including said spring means.

32. In a prison door operating and locking structure, the combination with a mechanism casing for housing prison door operating and locking mechanism, release mechanism including a key operated release member projecting from said casing which member when operated to its release position disconnects operating mechanism in said casing from its associated prison door, a removable chase-way cover in front of said casing and having a keyhole in alignment with said release member, a keyhole cover pivotally secured to the inside of said chase-way cover to move in a plane parallel to said chase-way cover, a keyhole cover operating shaft operable manually from a remote point projecting from said mechanism casing and coaxial with the pivot of said keyhole cover, ears on said keyhole cover, and spring means secured to said cover operating shaft and engaging said keyhole cover between said ears, said ears being sloped at their outside edges whereby said chase-way cover may be removed without interference by the operative connection between said keyhole cover and its operating shaft including said spring means and may be restored even though said spring is not in alignment with that portion of said keyhole cover between said ears in that movement of said spring through its arc of movement will cause it to ride up the sloped edges of said ears into position between said ears.

33. In a prison door operating and locking structure, the combination with a mechanism casing for housing prison door operating and locking mechanism, release mechanism including a key operated release member projecting from said casing which member when operated to its release position disconnects operating mechanism in said casing from its associated prison door, a removable chase-way cover in front of said casing and having a keyhole in alignment with said release member, a keyhole cover pivotally secured to the inside of said chase-way cover to move in a plane parallel to said chaseway cover, a keyhole cover operating shaft in said casing and projecting from said casing coaxially with the pivot of said keyhole cover, a release bar slidably mounted in said casing and controlled for endwise movement by a master bar extending to a remote point, a toothed gear sector secured on said keyhole cover operating shaft and a tooth projecting from said release bar to engage between teeth of said gear sector to rotate said shaft during sliding movement of said release bar.

34. In a prison door operating and locking structure, the combination with a mechanism casing for housing prison door operating and locking mechanism, release mechanism including a key operated release member projecting from said casing which member when operated to its release position disconnects operating mechanism in said casing from its associated prison door, a removable chase-way cover in front of said casing and having a keyhole in alignment with said release member, a keyhole cover pivotally secured to the inside of said chase-way cover to move in a plane parallel to said chase-way cover, a keyhole cover operating shaft in said casing and projecting from said casing coaxially with the pivot of said keyhole cover, a release bar slidably mounted in said casing and controlled for endwise movement by a master bar extending to a remote point, a toothed gear sector secured on said keyhole cover operating shaft and a tooth projecting from said release bar to engage between teeth of said gear sector to rotate said shaft during sliding movement of said release bar, said release bar being provided with notches on each side of its tooth to provide clearance for the teeth of said gear sector and to prevent return of said gear sector after it has been operated by said release bar until said release bar is returned to its former position.

35. Prison door operating and locking mechanism comprising, two operating bars of general rectangular cross-section standing on edge and secured to each other in spaced relation, said bars being notched with their notches aligned, a spindle connecting said operating bars to constitute a horizontal pivot crosswise of the faces of said operating bars, a T-shaped latch having its end remote from its cross-bar pivoted on said pivot with the cross-bar lying in said notches, a door bar also of rectangular cross-section supported to slide on its edge along side one of said operating bars and provided with a similar notch engaged by the end of said crossbar when in registration, power operated means for operating said operating bars to the doorclosed and a door-open position, and means controlled from a remote point for moving said latch to its active and its inactive position.

36. In combination, a casing for housing power operated mechanism for operating and locking prison cell doors, a member in said casing mechanically operable from a remote point, a casing cover for said casing having a keyhole therein, a keyhole cover supported by said casing cover and movable to a keyhole-open or a keyholeclosed position, means operatively connecting said member and said keyhole cover for operating said keyhole cover by said member, a cylindrical shaft having a solid circular end projecting from the mechanism in said casing in alignment with said keyhole for operating such mechanism to lock or unlock such cell door, and a key having a cylindrical opening and provided with means for operatively engaging said shaft and of a size and shape to pass through said keyhole for rotating said shaft to lock or unlock such cell door.

OSCAR S. FIELD.